US011336442B2

(12) United States Patent
Curty Alonso et al.

(10) Patent No.: US 11,336,442 B2
(45) Date of Patent: May 17, 2022

(54) SECURE KEY AGREEMENT WITH UNTRUSTED PARTIES

(71) Applicant: Universidad de Vigo, Vigo (ES)

(72) Inventors: Marcos Curty Alonso, Pontevedra (ES); Lo Hoi-Kwong, Toronto (CA)

(73) Assignee: UNIVERSIDAD DE VIGO, Vigo (ES)

( * ) Notice: Subject to any disclaimer, the term of this patent is extended or adjusted under 35 U.S.C. 154(b) by 140 days.

(21) Appl. No.: 16/762,464

(22) PCT Filed: Nov. 8, 2018

(86) PCT No.: PCT/ES2018/070722
§ 371 (c)(1),
(2) Date: May 7, 2020

(87) PCT Pub. No.: WO2019/092299
PCT Pub. Date: May 16, 2019

(65) Prior Publication Data
US 2021/0385079 A1    Dec. 9, 2021

(30) Foreign Application Priority Data

Nov. 8, 2017    (ES) ................... ES201700755

(51) Int. Cl.
*H04L 9/08*  (2006.01)
*H04L 9/06*  (2006.01)

(52) U.S. Cl.
CPC .......... *H04L 9/0861* (2013.01); *H04L 9/0643* (2013.01); *H04L 9/085* (2013.01); *H04L 9/0838* (2013.01); *H04L 9/0858* (2013.01)

(58) Field of Classification Search
None
See application file for complete search history.

(56) References Cited

U.S. PATENT DOCUMENTS

| 10,057,058 | B2 * | 8/2018 | Murakami | H04L 9/0858 |
| 2007/0076871 | A1 | 4/2007 | Renes | |
| 2013/0208894 | A1 * | 8/2013 | Bovino | H04L 9/0852 380/278 |
| 2013/0315395 | A1 * | 11/2013 | Jacobs | H04L 9/0852 380/278 |

(Continued)

FOREIGN PATENT DOCUMENTS

| EP | 1811719 A1 | 7/2007 |
| WO | 2019092299 A1 | 5/2019 |

OTHER PUBLICATIONS

Chen et. a., A practical two-way system of quantum key distribution with untrusted source, 2011 Chinese Phys. B 20 100305 (Year: 2011).*

(Continued)

*Primary Examiner* — Eleni A Shiferaw
*Assistant Examiner* — Bassam A Noaman
(74) *Attorney, Agent, or Firm* — Jaffery Watson Mendonsa & Hamilton LLP

(57) ABSTRACT

Traditional key generation methods in a noisy network often assume trusted devices and are thus vulnerable to many attacks including covert channels. The present invention differs from previous key generation schemes in that it presents a mechanism which allows secure key generation with untrusted devices in a noisy network with a prescribed access structure.

10 Claims, 4 Drawing Sheets

(56) References Cited

U.S. PATENT DOCUMENTS

| | | | |
|---|---|---|---|
| 2016/0134420 A1* | 5/2016 | Guinnard | H04B 10/70 380/256 |
| 2016/0149700 A1 | 5/2016 | Fu et al. | |
| 2016/0352515 A1* | 12/2016 | Bunandar | H04L 9/0852 |

OTHER PUBLICATIONS

PCT Search Report and Written Opinion for PCT Application No. PCT/ES2018/070722, 12 pages, dated Apr. 10, 2019.

Anonymous, "Quantum key distribution—Wikipedia": Oct. 26, 2017, XP55579835, URL: https://en.wikipedia.org/w/index.php?title=Quantum_key_distribution&oldid=807151, 12 pages.

Menezes AJ et al., "Chapter 13: Key Management Techniques", Handbook of Applied Cryptography, pp. 543-590, ISBN: 978-0-8493-8523-0, URL:http://www.cacr.math.uwaterloo.ca/hac/.

Maurer et al., "Secret-key agreement over unauthenticated public channels-part III: Privacy amplification", IEEE Transactions on Information Theory, vol. 49, No. 4, 2003, pp. 839-851, XP055256222.

Ometov et al., "Securing Network-Assisted Direct Communication: The Case of Unreliable Cellular Connectivity", Department of Electronics and Communications Engineering, Tampere, Finland, 20 pages, Aug. 27, 2015.

Gao et al., "Post-processing of the oblivious key in quantum private queries" State Key Laboratory of Networking and Sitching Technology, Jun. 4, 2014, 11 pages.

Delvaux et al., "Helper Data Algorithms for PUF-Based Key Generation: Overview and Analysis", CSE/LoCCS, Shanghai Jiao Tong University, 14 pages, 2015.

Lo et al., "Secure Quantum Key Distribution", Center for Quantum Information and Quantum Control, 13 pages, May 21, 2015.

Colombier et al., "Key Reconciliation Protocols for Error Correction of Silicon PUF Responses", IEEE Transactions on Information Forensics and Security, Institute of Electrical and Electronics Engineers, 2017, 12 (8), pp. 1988-2002.

Bennett, et al., "Generalized Privacy Amplification", presented at IEEE International Symposium on IT, Jun. 1994, Trondheim, Norway.

Bennett, et al., "Quantum Cryptography: Public Key Distribution and Coin Tossing", International Conference on Computers, Systems & Signal Processing, Bangalore, India, Dec. 1984, pp. 175-179.

International Preliminary Report on Patentability, PCT Application No. PCT/ES2018/070722, dated May 12, 2020, 10 pages, WIPO.

* cited by examiner

SECURE KEY AGREEMENT WITH UNTRUSTED PARTIES

RELATED APPLICATIONS

The present application claims priority under 35 U.S.C. § 371 to International patent application No. PCT/ES2018/070722 filed on Nov. 8, 2018, entitled "SECURE KEY AGREEMENT WITH NON-TRUSTED DEVICES", which claims priority to Spanish Application No. P201700755, filed Nov. 8, 2017 the entire contents of which are hereby incorporated by reference herein.

FIELD OF THE INVENTION

The present invention relates to a secure method and system for generating a random cryptographic key in a noisy network.

BACKGROUND OF THE INVENTION

Cryptography is the art of code-making. In cryptography, the security of a protocol often relies on the secrecy of a cryptographic key. A cryptographic key is usually a random string of numbers. If two parties, Alice and Bob, share a common secret cryptographic key, K, then they can achieve both secure communication and authentication (two important applications of cryptography) using several known cryptographic procedures. How to generate and distribute a key between two or more parties is a major challenge in cryptography. It is called the key distribution problem. Various methods for solving the key distribution problem have been proposed. Let us give a few examples here. The first example is public key cryptography. In public key cryptography, the key distribution problem is solved by making computational assumptions. There is a pair of keys, for example, one for encryption and one for decryption. Given the encryption key, in principle, the information for the decryption key is available. But, in practice, it would take too long for a conventional computer to figure out the decryption key, provided that some problems such as factoring large integers are assumed to be intractable with conventional computers. The second example of a key distribution method is quantum cryptography, more specifically, quantum key distribution (QKD). For a review on QKD, see, for example, Lo, H.-K., Curty, M. and Tamaki, K. Secure quantum key distribution. Nat. Photon. 8, 595-604 (2014). In QKD, the key distribution problem is solved by using the no-cloning theorem in quantum mechanics. For instance, in the known standard Bennett-Brassard BB84 protocol for QKD (see for example, Bennett, C. H. and Brassard, G. Quantum cryptography: public key distribution and coin tossing. Proc. IEEE Int. Conf. Comp. Systems Signal Processing 175-179 (IEEE, 1984)), say one party, Alice, sends to a second party, Bob, a sequence of photons prepared in different polarisation states, which are chosen from two possible conjugate bases, X and Z. For each photon, Bob selects randomly one of the two conjugate bases and performs a measurement. He records the outcome of his measurement and the basis choice. Through an authenticated channel, Alice and Bob broadcast their measurement bases. They discard all polarisation data sent and received in different bases and use the remaining data to generate a shifted key. To test for tampering they compute the quantum bit error rate (QBER) of a randomly selected subset of data and verify that the QBER is below a certain threshold value. By applying classical post-processing protocols such as error correction and privacy amplification, they generate a secure key. This way, during an eavesdropping attack, an eavesdropper, Eve, who does not have the basis information, would introduce unavoidable disturbance to the signals, which would be detectable by the legitimate users, Alice and Bob. The third example is Maurer's public key agreement protocol (see Maurer U. M. Secret key agreement by public discussion from common information. IEEE Trans. on Inf. Theory 39, 733-742 (1993)). There, for instance, two parties, Alice and Bob, might be receiving broadcast signals from a common source, Charlie, in a distant galaxy. If one assumes that the noises suffered by the receiving devices of the two parties are independent of the noise suffered by the receiving devices of an eavesdropper, Eve, a shared key can be distilled by the two parties, Alice and Bob, in such a way that it is secure against Eve.

Secret sharing schemes are commonly used in cryptography. In a secret sharing scheme, it is often important to define an access structure. For instance, in a (n, r) threshold secret sharing scheme, a secret string, say K, is divided by a dealer into shares that are distributed among n parties such that any subset of r parties getting together will be able to recover the value of the string, K, but any subset of less than r parties would have absolutely no information whatsoever about the value of the string, K. We note that non-threshold secret sharing schemes do exist and they allow more general access structures. To address the possibility that the dealer himself could be dishonest, and in order to guarantee that the shares distributed during the different steps of the protocol are consistent, verifiable secret sharing schemes have been proposed. Regarding applications, secret sharing can be used to split a generated key in a hardware secure module (HSM). Note that, in these cases, it is often assumed that the channels are noiseless, but some of the participants could be untrusted.

In contrast, in both QKD and Maurer's key agreement model, it is assumed that the channels used to generate a key may be noisy. For instance, QKD often uses as signals weak coherent light pulses or entangled photon pairs. These signals may be sent over long distance of open air or telecom fibers. For example, QKD has been recently performed over 404 km of ultra-low-loss fibers with the measurement-device-independent quantum key distribution protocol and entanglement has been sent over 1200 km (through a quantum communication satellite link). Note that an eavesdropper is free to eavesdrop such quantum channel (a communication channel which can transmit quantum information) in QKD. Owing to channel noise and potential eavesdropping attacks, there is often substantial quantum bit error rate (QBER) of order 0.5% to 13% in a quantum channel. To be able to generate a secret key in this situation, QKD typically assumes that, in addition to a quantum channel, there is an authenticated classical channel (or a public channel) between Alice and Bob. Such an authenticated classical channel can be used for the public discussion phase of a QKD protocol. It allows, for instance, Alice and Bob to compare a subset of quantum signals to estimate the QBER in a quantum transmission. When the QBER is too high, Alice and Bob can simply abort the QKD protocol. Otherwise, Alice and Bob proceed to distil a secure key by applying some classical post-processing protocol, which may include several steps like, for instance, post-selection of data, adding noise, parameter estimation, information reconciliation (which typically includes an error correction step together with an error verification step), and privacy amplification. This is so because there are some problems that need to be solved in order to distil a secure usable key: First, the keys held by Alice and Bob, $k_A^{raw}$ and $k_B^{raw}$ respectively, might be different from each other. It is important for them to perform some process to correct potential discrepancies in their raw keys; Such a process is called information reconciliation. One way to perform information reconciliation is for Alice to employ some conventional error correcting codes and compute and announce in public the resulting error syndrome. Bob, on receiving the error syndrome, can then reconcile his key with Alice. At the end, Alice and Bob might perform an error verification step to confirm that they hold reconciled keys, $k_A^{rec}$ and $k_B^{rec}$, that are the same as each other with high probability. Second, an eavesdropper or adversary might have partial information on the raw key. The goal of privacy amplification is to remove with high probability any residual information that Eve might have on the raw key. Privacy amplification is a process in which a long string of partially secure numbers is compressed into a shorter string that is almost perfectly secure against an adversary, Eve. Privacy amplification could be achieved by applying a two-universal hash function, see Bennett, C. H., Brassard, G., Crepeau, C. and Maurer, U. M. Generalized privacy amplification. IEEE Trans. on Inf. Theory 41, 1915-1923 (1995). For instance, one particularly simple example of privacy amplification is to use random hashing. More concretely, given an input n-bit string represented by a column vector, X, one might first generate a random m×n matrix, M, (where m<n) of randomly chosen binary entries and then compute an output m-bit string, Y=M X, by performing matrix multiplication between the two matrices M and X in modulo 2 algebra. In the case of QKD, Alice might choose the entries of M and then broadcast their values to Bob through an authenticated classical channel.

Schemes such as secret sharing, QKD and Maurer's key agreement scheme can provide information-theoretic security, which is also called unconditional security. That is security based on information theory and that is not dependent on any computational assumptions.

There have been a lot of interests in quantum hacking against practical QKD systems. These hacking attacks typically exploit the fact that the behaviour of real QKD devices usually deviates from that considered in the security proofs of QKD. This opens security loopholes which could be used by the eavesdropper to attack QKD implementations. For instance, a memory attack has been proposed as a method to foil even device-independent (DI)-QKD schemes. In a memory attack, Eve hides a memory in say Alice's system to store up all the key material generated in each QKD run. Afterward, the memory leaks the key material to the channel by hiding it in say the decision of abort or not abort of a subsequent QKD session, or in the public discussion of subsequent QKD runs. This could be done by properly modifying the raw key and/or the protocol information that is sent, in that round, to the classical post-processing unit(s) (CLPU) that perform the classical post-processing protocol of the QKD system. Memory attacks constitute an example of covert channels, which together with Trojan Horses, are known to be major challenges to the security of conventional cryptographic systems. Note that Trojan Horses could be hidden in both hardware or software modifications of the cryptographic systems.

SUMMARY OF THE INVENTION

The problems found in prior art techniques are generally solved or circumvented, and technical advantages are generally achieved, by the disclosed embodiments which provide a method and system wherein two or more cryptographic stations generate a shared key secure within a prescribed access structure, in the presence of a noisy channel in a network and possibly untrusted components inside cryptographic station(s).

Considering the functional decomposition of a cryptographic station into key generation units and classical post-processing units, the present invention provides security in the presence of both untrusted key generation units and untrusted classical post-processing units. In an embodiment, in order to counter untrusted key generation units, privacy amplification is applied by classical post-processing units to ensure security against information obtained by the untrusted components inside the cryptographic stations and in order to counter untrusted classical post-processing units, a raw cryptographic key is divided into shares and distributed among multiple classical post-processing units. The invention can be used to foil covert channels and defeat both hardware and software Trojan Horses. It can provide information-theoretic security for the generated key, which can subsequently be used to achieve communication and authentication with unconditional security.

In a first aspect, the present invention proposes a method for secure cryptographic keys generation in the presence of untrusted units in a cryptographic system, the system comprising a first and a second cryptographic stations (A,B), where each cryptographic station comprises n raw data generation units, $KGU^A_i$, $KGU^B_i$ with i=1, 2, . . . , n, where n>1, and at least one post-processing unit $CLPU^A$ $CLPU^B$, where the method comprises the following steps:

Each pair of raw data generation units, $KGU^A_i$ and $KGU^B_i$, with i=1, 2, . . . , n, generating a pair of (raw) data strings and sending (via secure communication channels) the generated data string by $KGU^A_i$ to the at least one post-processing unit of the first cryptographic station and sending the generated data string by $KGU^B_i$ to the at least one post-processing unit of the second cryptographic station. Each pair of data strings (one generated by a raw data generation unit of the first cryptographic station $KGU^A_i$ and one generated by a raw data generation unit of the second cryptographic station $KGU^B_i$, with i=1, 2, . . . , n) usually will be correlated in the sense that it will be generated using a mechanism (for example QKD, Quantum Key Distribution) which allows that each pair of data springs of the first and second cryptographic stations are correlated (also called statistically correlated). That is each pair of data strings are not statistically independent of each other but statistically dependent, so if the value of one of the data strings is known, information about the value of the other data string could be obtained.

The at least one post-processing units of the first and second cryptographic station, $CLPU^A$, $CLPU^B$:
applying a post-processing procedure to each received data string for generating a cryptographic key, $K^A_i$, $K^B_i$ i=1, 2, . . . , n, or an error symbol (an error symbol will be generated if the raw data generations unit it has not been able to generate a cryptographic key) for each raw data generation unit, where the post-processing procedure includes at least one information reconciliation operation between the post-processing units of both cryptographic stations via an authenticated communication channel and a first privacy amplification procedure to extract a shorter key;
concatenating the generated cryptographic keys to form a first concatenated cryptographic key $K^{A'}=[K^A_1, K^A_2, \ldots, K^A_M]$ and a second concatenated cryptographic key $K^{B'}=[K^B_1, K^B_2, \ldots, K^B_M]$ where M is the number of pairs of generated cryptographic keys in both cryptographic stations which are different from the error symbol;

applying an additional privacy amplification procedure operation to the first concatenated cryptographic key and to the second concatenated cryptographic key to extract a first and a second secure cryptographic keys respectively, $K^A$ and $K^B$.

According to another aspect, it is proposed a method for secure cryptographic keys generation in the presence of untrusted units in a cryptographic system, the system comprising a first and a second cryptographic stations (A,B), where each cryptographic station comprises at least one raw data generation unit, $KGU^A$, $KGU^B$ respectively and more than one post-processing units $CLPU^A_l$, $CLPU^B_{l'}$, l=1, 2, ..., s, l'=1, 2, ... s', where the method comprises the following steps:

$KGU^A$ generating s data strings and sending one generated data string to each $CLPU^A_l$ and $KGU^B$ generating s' data strings and sending one different generated data string to each $CLPU^B_{l'}$; Each pair of data strings (one generated by the raw data generation unit of the first cryptographic station $KGU^A$ and one generated by the raw data generation unit of the second cryptographic station $KGU^B$) will be correlated in the sense that it will be generated using a mechanism (for example QKD), so each pair of data springs of the first and second cryptographic stations are correlated (also called statistically correlated). That is, each pair of data strings are not statistically independent of each other, so if the value of one of the data strings is known, information about the value of the other data string could be obtained.

Each post-processing unit of the first and second cryptographic stations:

applying a post-processing procedure to each received data string generating a cryptographic key or an error symbol for each received data string, where the post-processing procedure includes at least one information reconciliation operation between the post-processing units of both cryptographic stations via an authenticated communication channel and a first privacy amplification procedure to extract a shorter key;

dividing the generated cryptographic keys into two or more shares and distributing them among the rest of post-processing units of the first and second cryptographic stations respectively;

generating a share of a secure cryptographic key by applying an error verification procedure and an additional privacy amplification procedure operation to the received cryptographic keys shares; According to another aspect, it is proposed a method for secure cryptographic keys generation in the presence of untrusted units in a cryptographic system, the system comprising a first and a second cryptographic stations (A,B), where each cryptographic station comprises at least one raw data generation unit, $KGU^A$, $KGU^B$ and more than one post-processing units $CLPU^A_i$, $CLPU^B_{i'}$, i=1, 2, ..., s, i'=1, 2 ... s', where the method comprises the following steps:

The at least one raw data generation units in the first and second cryptographic stations generating a data string, $R^A$, $R^B$ respectively, dividing the generated data strings into two or more shares and distributing them among the post-processing units of the first and second cryptographic stations respectively where $K'A_{ij}$ is the j-th share of $R^A$ received by $CLPU^A_i$ and $K'^B_{i'j'}$ is the j'-th share of $R^B$ received by $CLPU^B_{i'}$. The pair of data strings (one generated by the raw data generation unit of the first cryptographic station $KGU^A$ and one generated by the raw data generation unit of the second cryptographic station $KGU^B$) will be correlated in the sense that it will be generated using a mechanism (for example QKD), so each pair of data springs of the first and second cryptographic stations are correlated (also called statistically correlated). That is each pair of data strings are not statistically independent of each other, so if the value of one of the data strings is known, information about the value of the other data string could be obtained.

The number of shares j, j', in which the data strings are divided, could be equal to the number of CLPUs (so each CLPU receives one share) or could be lower or higher (so each CLPU could receive more than one share).

Each post-processing unit of the first and second cryptographic stations:

obtaining from each received share of the data string $R^A$, $R^B$ a key generation sub-string share $K'^A_{ij,key}$, $K'^B_{i'j',key}$ (this sub-string could be just a part of the received share of the data strings, that is, the received shares could be divided in several sub-strings and one of these sub-strings will be used for key generation); from each received share of the data string it could be also obtained a parameter estimation sub-string share $K'^A_{ij,est}$, $K'^B_{i'j',est}$ and said parameter estimation sub-strings shares will be send to the rest of post-processing units of the cryptographic unit.

applying a post-processing procedure to the key generation sub-strings shares generating secure cryptographic key shares, where said post-processing procedure includes at least one information reconciliation operation between the post-processing units of both cryptographic stations via an authenticated communication channel and a privacy amplification procedure to extract a shorter key.

In this last embodiment, the information reconciliation operation could include an error correction procedure which comprises:

applying certain predefined matrices $M_{EC}$ to the key generation sub-strings shares obtaining data strings $s^A_{ij}=M_{EC}*K'^A_{ij,key}$, $s^B_{j'}=M_{EC}*K'^B_{i'j',key}$ respectively;

obtaining in each post-processing unit a reconstructed data string $s^A$, $s^B$ defined $s^A=s^A_1 \oplus \ldots \oplus s^A_q$ and $s^B=s^B_1 \oplus \ldots \oplus s^B_{q'}$, respectively, where $s^A_j$ is obtained from $s^A_{ij}$ by using majority voting and $s^B_{j'}$ is obtained from $s^B_{i'j'}$ by using majority voting;

modifying the value of the key generation sub-strings $K'^A_{ij,key}$, $K'^B_{i'j',key}$ depending on the actual values of $s^A$ and $s^B$;

repeat the three steps of the error correction procedure until the error is below a predefined threshold;

In this last embodiment, the information reconciliation operation could include an error verification procedure which comprises:

The post-processing units of the first cryptographic station randomly selecting a two-universal hash function, hash, and applying it to the key generation sub-strings shares obtained after the error correction procedure, $K^A_{ij,key}$, obtaining $h^A_{ij}=hash(K^A_{ij,key})$, and each post-processing unit of the second cryptographic station obtaining $h^B_{i'j'}=hash(K^B_{i'j',key})$ and each post-processing unit sending the shares $h^A_{ij}$ and $h^B_{i'j'}$ to all the post-processing units in his own cryptographic unit and to all the post-processing units in the other cryptographic unit;

obtaining in each post-processing unit a reconstructed data string $h^A$, $h^B$ respectively as $h^A = h^A_1 \oplus \ldots \oplus h^A_q$ and $h^B = h^B_1 \oplus \ldots \oplus h^B_{q'}$, respectively, where $h^A_j$ is obtained from $h^A_{ij}$ by using majority voting and $h^B_{j'}$ is obtained from $h^B_{i'j'}$ by using majority voting.

Each of the post-processing units checking whether or not $h^A = h^B$ and if they are equal they proceed to the privacy amplification procedure, otherwise outputting an abort symbol.

In this last embodiment, the privacy amplification procedure may comprise:

The post-processing units of the first cryptographic station randomly selecting a two-universal hash function hashPA, and then obtaining shares of a secure cryptographic unit as $K^A_{ij} = \text{hashPA}(K^A_{ij,key})$ and each post-processing unit of the second cryptographic station obtaining shares of a secure cryptographic unit as $K^B_{i'j'} = \text{hashPA}(K^B_{i'j',key})$.

According to another aspect, it is proposed a method for secure cryptographic keys generation in the presence of untrusted units in a cryptographic system, the system comprising a first and a second cryptographic stations (A,B), where each cryptographic station comprises a plurality of raw data generation units, $KGU^A_i$, $KGU^B_i$ with $i = 1, 2, \ldots, n$, $n > 1$ and a plurality of post-processing units $CLPU^A_l$, $CLPU^B_{l'}$, $l = 1, 2, \ldots, s$, $l' = 1, 2. s'$, where the method comprises the following steps:

Each raw data generation unit in the first and second cryptographic stations generating data strings, $R^A_i$, $R^B_i$ with $i = 1, 2, \ldots, n$, respectively, dividing the generated data strings into two or more shares and distributing them among the post-processing units of the first and second cryptographic stations respectively. Each pair of data strings ($R^A_i$, $R^B_i$ with $i = 1, 2, \ldots, n$) usually will be correlated in the sense that it will be generated using a mechanism (for example QKD) that makes that each pair of data springs of the first and second cryptographic stations are correlated (also called statistically correlated). That is, each pair of data strings are not statistically independent of each other, so if the value of one of the data strings is known, information about the value of the other data string could be obtained.

Each post-processing unit applying a post-processing procedure to each received data string share, generating a first cryptographic key shares $K'^A_{lij}$, $K'^B_{l'ij'}$ or an error symbol for each received data string share, where the post-processing procedure includes at least an information reconciliation operation between the processing units of both cryptographic stations via an authenticated communication channel and a first privacy amplification procedure, where $K'^A_{lij}$ is the j-th share of the cryptographic key for $R^A_i$ obtained by $CLPU^A_l$, and $K'^B_{l'ij'}$ is the j'-th share of the cryptographic key for $R^B_i$ obtained by $CLPU^B_{l'}$;

Each post-processing unit obtaining shares of a secure cryptographic key by concatenating the obtained first cryptographic key shares and applying an additional privacy amplification procedure operation to the concatenated string. This last step may comprise:

Concatenation sub-step: Each $CLPU^A_l$, with $l = 1, \ldots, s$ obtaining bit strings $K''^A_{lij} [0_1, \ldots, 0_{i-1}, K'^A_{lij}, 0_{i+1}, \ldots, 0_M]$, where $0_i$, with $i = 1, \ldots, M$, represents a zero vector, and M is the number of pairs of raw generation units (one from each cryptographic station) which generate data strings different from an error symbol and each $CLPU^B_{l'}$, with $l' = 1, \ldots, s'$ obtaining bit strings $K''^B_{l'ij'} = [0_1, \ldots, 0_{i-1}, K'^B_{l'ij'}, 0_{i+1}, \ldots, 0_M]$, with $i = 1, \ldots, M$;

Privacy amplification sub-step: Each $CLPU^A_l$, with $l = 1, \ldots, s$, randomly selecting a two-universal hash function hashPA, and then obtaining shares of a secure cryptographic key as $K^A_{lij} = \text{hashPA}(K''^A_{lij})$ and each $CLPU^B_{l'}$, with $l' = 1, \ldots, s'$ obtaining shares of a secure cryptographic key as $K^B_{l'ij'} = \text{hashPA}(K''^B_{l'ij'})$.

The pair of data strings generated by each pair of raw data generation units (one of the first cryptographic station and one of the second cryptographic station respectively) may be generated using a quantum key distribution mechanism.

For dividing in shares a secret sharing scheme or a verifiable secret sharing scheme could be employed. At the end of the methods, a reconstruct scheme could be applied to the secure cryptographic shares obtained in order to obtain a first and a second final cryptographic keys respectively.

In other aspects, systems for secure cryptographic keys generation are proposed. Said systems will comprise a first and a second cryptographic stations (A,B), where each cryptographic station comprises at least one raw data generation units and at least one post-processing unit $CLPU^A$ $CLPU^B$, with means for implementing the methods proposed above.

In a last aspect of the present invention, a computer program is disclosed, comprising computer program code means adapted to perform the steps of the described methods, when said program is run on processing means of a network entity of an OFDM network, said processing means being for example a computer, a digital signal processor, a field-programmable gate array (FPGA), an application-specific integrated circuit (ASIC), a micro-processor, a micro-controller, or any other form of programmable hardware. A non-transitory digital data storage medium is also provided for storing a computer program comprising instructions, causing a computer executing the program to perform all steps of the disclosed methods when the program is run on a computer.

DESCRIPTION OF FIGURES

To complete the description that is being made and with the object of assisting in a better understanding of the characteristics of the invention, in accordance with preferred example of practical embodiments thereof, accompanying said description as an integral part thereof, is a set of drawings wherein, by way of illustration and not restrictively, the following has been represented.

DESCRIPTION OF THE INVENTION

Figure 1:
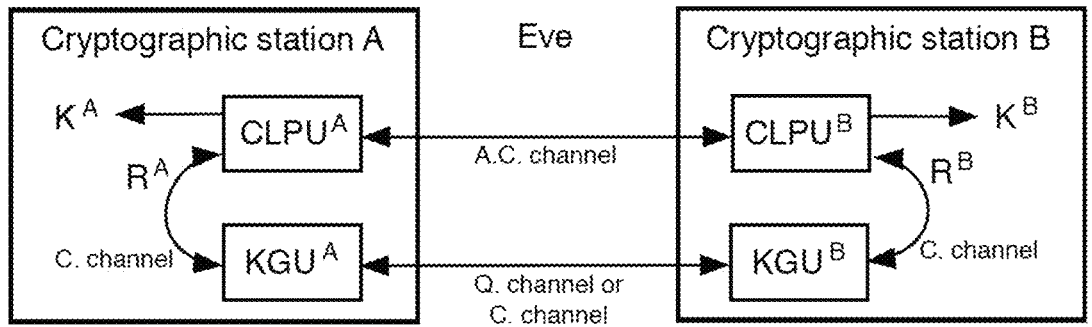
FIG. 1 shows a schematic block diagram of a prior art cryptographic set-up.

The invention describes methods and systems for, in general terms, generating a secure shared key between two or more cryptographic stations (an station which is able to generate cryptographic keys for example for secure communication or authentication between two electronic devices). Said shared key is generated in the presence of a noisy channel in a communications network (communicating the cryptographic stations) and possibly untrusted components inside cryptographic station(s).

Consider a communication network allowing communication between various cryptographic stations together with any intermediary or ancillary nodes. Each cryptographic station may represent, for example, an electronic node as a secure site such as a data center, or a co-location facility, a service provider or an end user electronic communications device such as a smart phone held by an end user or for example, a mobile phone, laptop, i-pad, tablet, PC . . . or generally speaking, any other type of electronic device which may generate cryptographic keys for communication or authentication with another party. To achieve either unconditional secure communication or authentication between, for example, two cryptographic stations, traditionally called, A and B or Alice and Bob (where Alice and Bob are supposed to be the parties or users controlling each cryptographic station respectively) in the presence of an adversary or eavesdropper, Eve, it is important for Alice and Bob to share a cryptographic key, K, that is random and secret.

A cryptographic station contains both key generation unit(s) (KGU) and classical post-processing unit(s) (CLPU). Key generation units (also called raw data generation units) generate correlated raw data (also known as primary data, that is, data obtained directly from a data source) between distant parties, which is afterwards processed by the CLPU to obtain the cryptographic key. For instance, in Maurer's scheme, key generation units could be antennas that are receiving signals from a common source in a distant radio galaxy. Classical post-processing units (also called just post-processing units) can be any conventional processing devices (also called processing units or processing modules) such as for example. Central Processing Units (CPUs), Graphical Processing Units (GPUs), and Field Programmable Gate Arrays (FPGAs)) or any other electronic unit with computation capabilities. A pair of KGUs distributed between the two cryptographic stations, A and B, use some physical means to generate correlated noisy (raw) data between the cryptographic stations. Such physical means for generating correlated data could be, for example, QKD. In the case of QKD, such raw data could be either prepared or measured polarization data of single photon signals. Each single photon has a polarization. For instance, in the rectilinear basis Z, a vertically polarized photon could represent a "0" whereas a horizontally polarized photon could represent a "1". Similarly, in the diagonal basis X, a 45-degree polarized photon could represent a "0" whereas a 135-degree polarized photon could represent a "1". Each KGU then passes the correlated noisy raw data to classical post-processing unit(s) to be processed, obtaining cryptographic key K. While this discussion is general, for ease of illustration, we take the example of QKD. In QKD, Alice and Bob are connected by two channels, one quantum and one classical. The quantum channel is used for the transmission of quantum signals such as polarization data of single photons. Such quantum signals can be used to generate raw key material. Eve is free to tamper with the quantum channel, which can be an optical fiber or free space or other media (e.g. water). The term "classical" channel simply means a conventional communication channel that can transmit conventional information. The classical channel may be of any form including a phone line, Internet, Ethernet, the known channels of a mobile communications network (GSM, UMTS, LTE, 3G, 4G or whatever) or a WI-FI network, even a direct wire or generally speaking any communications channel of any known conventional wired or wireless communications network. The classical channel may also be in the same medium as the quantum channel, for example, through spatial, time or frequency multiplexing. The classical channel is often assumed to be authenticated using any known authentication mechanism. CLPU(s) receive the correlated noisy raw key data and may apply various processing operations to it (which includes, for example, post-selection of data, adding noise, parameter estimation, information reconciliation, typically including an error correction step together with an error verification step, and privacy amplification). These operations will be described below in more detail.

A. A Prior Art Key Distribution Method and its Insecurity

FIG. 1 shows a prior art key distribution method with two cryptographic stations, A and B, in the presence of an eavesdropper, Eve, where each cryptographic station contains only one key generation unit (KGU) and one classical post-processing unit (CLPU). In other words, cryptographic station A contains $KGU^A$ and $CLPU^A$ while cryptographic station B contains $KGU^B$ and $CLPU^B$. In the figures, a superscript indicates whether the devices and keys correspond to the cryptographic station A or to the cryptographic station B. Each KGU generates a raw key, R, and each CLPU outputs a cryptographic key, K. $CLPU^A$ and $CLPU^B$ are connected through an authenticated conventional communication channel ("A.C. channel" in the figure, also called authenticated classical channel), and, within each cryptographic station, KGU and CLPU are connected through a classical (conventional) channel ("C. channel" in the figure). In QKD, a quantum channel ("Q. channel" in the figure) connects $KGU^A$ and $KGU^B$; in the case of Maurer's public key agreement protocol the KGUs could receive broadcast classical signals from a common source.

For instance, in a known QKD protocol (standard Bennett-Brassard BB84 protocol), two distant parties, Alice and Bob, would like to establish a secure cryptographic key between them. The cryptographic station A is controlled by one party, Alice (for example, the user of a first electronic communications device where the cryptographic station A is located), whereas cryptographic station B is controlled by another party, Bob (for example, the user of a second electronic communications device where the cryptographic station B is located). Now, $KGU^A$ prepares and sends via a quantum channel to the $KGU^B$, a sequence of photons prepared in different polarisation states, which are chosen by $KGU^A$ from two possible conjugate bases, X and Z. For each photon, $KGU^B$ selects randomly one of the two conjugate bases and performs a measurement. $KGU^B$ records the outcome of the measurement and the basis choice. Then, $KGU^A$ passes the polarization data, $R^A$, and other relevant ancillary information such as the basis information to CLPU$^A$ and KGU$^B$ passes the polarization data, R$^B$, and other relevant ancillary information such as the basis information to CLPU$^B$.

Through an authenticated channel (A.C. channel), CLPU$^A$ and CLPU$^B$ broadcast their preparation and measurement bases. They discard all polarisation data sent and received in different bases and use the remaining data to generate a sifted key. To test for tampering, CLPU$^A$ and CLPU$^B$ compute the quantum bit error rate (QBER) of a randomly selected subset of data and verify that the QBER is below a certain threshold value. By applying classical post-processing protocols such as for example, information reconciliation (which typically includes an error correction step together with an error verification step) and privacy amplification, CLPU$^A$ and CLPU$^B$ generate a secure key, K$^A$ and K$^B$, where with high probability a) K$^A$=K$^B$ and b) K$^A$ is secure against an eavesdropper.

In such a set-up, it is commonly assumed that all the KGUs (i.e., KGU$^A$ and KGU$^B$) and all the CLPUs (i.e., CLPU$^A$ and CLPU$^B$) are trusted. For instance, both device-independent and device-dependent settings of QKD are included in this framework.

Figure 2:
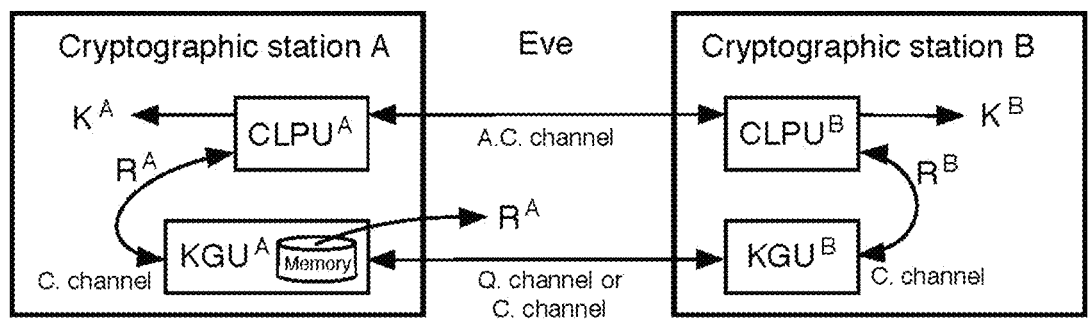
FIG. 2 shows a schematic block diagram illustrating a memory attack against a prior art cryptographic set-up with two cryptographic stations, A and B.

Standard device-dependent QKD assumes that QKD devices function correctly by, for example, preparing the correct state and performing perfect measurements in accordance with some theoretical protocols. In contrast, device-independent QKD has the advantage of allowing QKD devices to function in an arbitrary manner as long as there is no information leakage (e.g. about the final key) from cryptographic stations, A, and, B, to an eavesdropper. Unfortunately, such a prior art set-up is highly vulnerable to malicious attacks in either software and/or hardware. For example, if the eavesdropper Eve plants a memory in say, for example, KGU$^A$, then the security of such prior art key distribution method may be compromised. This is illustrated in FIG. 2. Eve could use this memory to store up the key material generated in a QKD session and then leak this information to the channel in subsequent QKD runs. For this, Eve could exploit for example the fact that each QKD run is often associated with a decision of abort or not abort depending on the observed QBER. The memory could then decide whether or not make KGU$^A$ to output a raw key, R$^A$, with a high QBER (and then force the protocol to abort) depending on the value of a certain bit of the key generated in a previous QKD run. Alternatively, the memory might also leak the key material of a certain QKD round by simply hiding it in the public discussion of subsequent QKD runs.

Hence, the way to perform secure key distribution when some of the KGUs or CLPUs are untrusted is an important non-solved challenge to prior art key distribution schemes.

B. Scenario 1: A Key Distribution Method with Untrusted Key Generation Units Inside a Cryptographic Station.

The key goal of the invention is to achieve security of key distribution in the presence of untrusted devices. These untrusted devices could be, for example, KGUs, CLPUs, or both of them together. In this section, it is considered the case when some KGUs might be untrusted but the CLPUs are assumed to be trusted.

Figure 3:
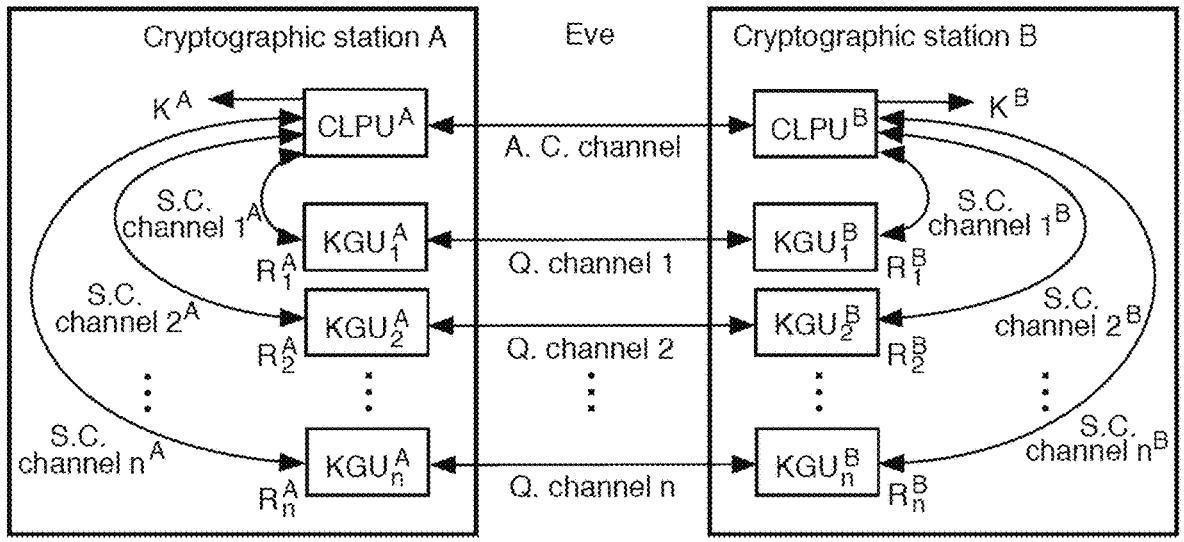
FIG. 3 shows a schematic block diagram of a secure key generation procedure according to one embodiment of the invention, in a scenario where at least one key generation unit KGU, is untrusted.

In this case, we consider a new key distribution protocol with multiple KGUs, as shown in FIG. 3. This figure shows two cryptographic stations, A and B, in the presence of an eavesdropper (for example, in the channels that connect the cryptographic stations A and B and also in some of Alice's and Bob's KGUs, making these KGUs untrusted KGUs), Eve. Each cryptographic station contains n (more than one) key generation units, KGU, as well as at least one classical post-processing unit, CLPU. The i-th KGU generates a raw key, R$_i$. The channel that connects CLPU$^A$ and CLPU$^B$ is a conventional authenticated communication channel ("A.C. channel" in the figure, also called authenticated classical channel). The channel that connects KGU$^A_i$ and CLPU$^A$ as well as the channel that connects KGU$^B_i$ and CLPU$^B$ are secure classical (conventional) channels ("S.C. channel" in the figure) for all i=1, . . . , n. Also, in QKD, the channel that connects KGU$^A_i$ and KGU$^B_i$ is a quantum channel ("Q. channel" in the figure) for all i=1, . . . , n.

That is, in this figure, the cryptographic station A has n (where n>1) units KGU$^A_1$, KGU$^A_2$, . . . KGU$^A_n$, and the cryptographic station B has n units KGU$^B_1$, KGU$^B_2$, . . . KGU$^B_n$. As a side remark, note that low-cost KGUs exist because of the development of chip-based QKD transmitters. Our invention can leverage such devices. Note that the various KGU pairs could be purchased from different vendors. Our invention allows us to increase trust and construct a secure key generation system with components from cheap untrusted vendors.

Of course, if all KGUs are compromised, then it is impossible to prove security so it is supposed that at least one of them is not compromised (that is, there is at least one trusted KGU). It is thus useful to define the access structure or adversary structure. By adversary structure, we mean what subsets of pairs of units KGU$^A_i$ and KGU$^B_i$ with i= 1, . . . , n, might be dishonest (untrusted) without affecting the security of the final key (a pair of units KGU$^A_i$ and KGU$^B_i$ is dishonest if at least one of its units is dishonest). In the definition of the adversary structure one could distinguish between dishonest devices which are passively controlled by Eve and those that are actively controlled by Eve. For example, a device passively controlled by Eve can leak its information to her, but otherwise it follows all the indications of the protocol correctly. A device actively controlled by Eve, on the other hand, can leak its information to her and, moreover, it does not have to necessarily follow the prescriptions of the protocol but its behaviour is fully governed by Eve. An example of adversary structure could be that at most 3 out of 4 pairs of units KGU$^A_i$ and KGU$^B_i$ might be dishonest and actively controlled by Eve. This means that at least one of the 4 pairs of units KGU$^A_i$ and KGU$^B_i$ is honest.

In FIG. 3 we assume that each cryptographic station, A and B, has at least one classical post-processing unit, CLPU$^A$ and CLPU$^B$ respectively. In this scenario, all the CLPUs are supposed to be trusted. Also, each KGU$^A_i$ is connected to CLPU$^A$ via a secure classical (conventional) channel (denoted as "S.C. channel i$^A$" in FIG. 3), and each KGU$^B_i$ is connected to CLPU$^B$ via a secure classical (conventional) channel (denoted as "S.C. channel i$^B$" in FIG. 3). In all this text, it is meant with "secure classical or conventional channel", a channel that provides both secrecy and authentication. This could be achieved, for instance, by using the one-time-pad together with say the Wegman-Carter authentication scheme or any other known mechanism. Note that in practice one may also use as secure classical channel, for example, a physically protected path (e.g., a physical wire that protects against damage and intrusion) that connects only the prescribed devices. We remark that all secure classical channels are used to connect devices which are located inside a cryptographic station. Moreover, there is an authenticated classical (conventional) channel that connects CLPU$^A$ and CLPU$^B$ (denoted as "A.C. channel" in FIG. 3). This could be achieved by using any known authentication scheme. In addition, in QKD, the units KGU$^A_i$ and KGU$^B_i$, with i=1, . . . , n, are connected to each other through a quantum channel, denoted as "Q. channel i" in FIG. 3, which is accessible to Eve. Note that all $KGU^A_i$ and $KGU^B_i$ could even share the same physical quantum channel (e.g. a single optical fiber) through various multiplexing techniques (e.g. wavelength multiplexing and spatial multiplexing).

Each unit $KGU^A_i$ in cryptographic station A sends the generated raw key, $R^A_i$, to $CLPU^A$ via the "S.C. channel $i^A$" shown in FIG. 3. If the cryptographic station A has more than one CLPU, then each $KGU^A_i$ might send either its raw key $R^A_i$ to each CLPU or its shares to one or more of the CLPUs in cryptographic station A. Similarly, each unit $KGU^B_i$ sends the generated raw key, $R^B_i$, to $CLPU^B$ via the "S.C. channel $i^B$". If the cryptographic station B has more than one CLPU, then each $KGU^B_i$ might send either its raw key $R^B_i$ or its shares to one or more of the CLPUs in cryptographic station B. If one assumes that here all CLPUs are trusted, then the direct transmission of the raw keys (i.e., without splitting them in shares) from the different KGUs to the CLPUs (within each cryptographic station) does not compromise the security.

The CLPUs may apply various classical post-processing steps to the raw keys received. Owing to environmental disturbances and potential eavesdropping attacks by Eve, the raw key $R^A_i$ generated by $KGU^A_i$ might be different from the raw key $R^B_i$ generated by $KGU^B_i$. Therefore, these classical post-processing steps usually should include information reconciliation and privacy amplification to ensure that the final keys generated, $K^A$ and $K^B$, in cryptographic stations A and B are secret and probably the same. In an information reconciliation step one or more of the CLPUs in cryptographic stations A and B may first interchange error correction information, which is then used to correct their data such that $K^A$ and $K^B$ are with high probability equal. This can be done using any known procedure (see, for example, Brassard G. and Salvail, L. Secret key reconciliation by public discussion. Université de Montreal Proc. of Advances in Cryptology (Eurocrypt 93), 410-23 (1993)). Next, cryptographic stations A and B might perform an error verification step to confirm that $K^A$ and $K^B$ are indeed equal to each other with high probability. The privacy amplification step is used to guarantee that the final key, $K^A$ and $K^B$, is indeed probably secret (i.e., Eve has only negligible information about it). For this, privacy amplification removes the partial information that Eve could have obtained about say for instance the raw keys $R^A_i$, with i=1, . . . , n. Eve might have obtained information about these raw keys by eavesdropping the quantum channels that connect the units $KGU^A_i$ and $KGU^B_i$ for all i, as well as by listening to the contents of the authenticated classical channel that connects $CLPU^A$ and $CLPU^B$. Also, all dishonest pairs $KGU^A_i$ and $KGU^B_i$ could directly leak $R^A_i$ to Eve. As mentioned earlier, privacy amplification may be done by hashing a raw key by applying a two-universal hash function (for example, by multiplying a string with a random matrix of binary entries).

In addition, the classical post-processing steps may also include, for example, post-selection of data, adding noise, parameter estimation and error verification. In each of these classical post-processing steps one or more of the CLPUs in cryptographic stations A and B can use the authenticated classical channel between them to interchange information and post-process their data. For instance, in the step of data post-selection the CLPUs divide the raw data $R^A_i$ and $R^B_i$ into different data sets. Just as an example, the CLPUs may divide the raw data in three main data sets. The first data set contains the raw data that will be post-processed to obtain a secure key, $K^A$ and $K^B$; the second data set (also denoted as parameter estimation data set) contains the raw data that will be used for parameter estimation in order to determine the parameters that are needed to generate $K^A$ and $K^B$ from the data in the first data set; and the third data set contains the raw data that is discarded. For instance, in the standard Bennett-Brassard BB84 protocol Alice and Bob usually discard the raw data associated to basis mismatched events. Also, the CLPUs may add noise to the raw data by flipping some of their bits (see, for example, Renner, R., Gisin, N. and Kraus B. An information-theoretic security proof for QKD protocols. Phys. Rev. A 72, 012332 (2005)) or any other known mechanism to add noise. In the parameter estimation step, on the other hand, the CLPUs use the data from the parameter estimation data set to determine bounds on the quantities that are needed to generate a secure key. These quantities may include, for example, the QBER, the phase error rate, the number of single-photon pulses emitted by Alice that contribute to the data set that is used to generate a secure key, etc. Finally, in the error verification step the CLPUs confirm that $K^A$ and $K^B$ are equal with certain probability. An information reconciliation process may consist of many steps and error verification may be the final step in the information reconciliation process. The purpose of error verification is to confirm that the information reconciliation process is successful. For this, they could use for example a two-universal hash function to compute a hash of both $K^A$ and $K^B$ and then they could check if both hashes are equal.

Below we describe, as an example, a protocol for key distillation that achieves security against dishonest KGUs. It can be decomposed in two main conceptual steps. In particular, suppose that all the units $KGU^A_i$ in cryptographic station A have sent the raw key data $R^A_i$ to $CLPU^A$, and also suppose that all the units $KGU^B_i$ in cryptographic station B have sent the raw key data $R^B_i$ to $CLPU^B$. Then, in a first step, the units $CLPU^A$ and $CLPU^B$ post-process the data $R^A_i$ and $R^B_i$ for all i to obtain a secret key, $K^A_i$ and $K^B_i$, or the abort symbol $\perp_i$. In the case of using QKD for raw data generation, an abort symbol may be generated when the Quantum Bit Error Rate is higher than some prescribed value (e.g. 11% in the case of Shor-Preskill proof for the Bennett-Brassard BB84 protocol). For this, $CLPU^A$ and $CLPU^B$ may use some of the classical post-processing steps described above. These classical post-processing steps may include a privacy amplification step to remove Eve's partial information about $K^A_i$ and $K^B_i$ due to her eavesdropping on the "Q. channel i" (see FIG. 3) that connects $KGU^A_i$ and $KGU^B_i$ as well as due to Eve listening to the contents of the authenticated classical channel that connects the units $CLPU^A$ and $CLPU^B$. Next comes a key step in this embodiment of the invention. In particular, in a second step, $CLPU^A$ and $CLPU^B$ apply an additional privacy amplification step to $K^{A'}=[K^A_1, K^A_2, \ldots, K^A_M]$ and $K^{B'}=[K^B_1, K^B_2, \ldots, K^B_M]$, where M represents the number of pairs $K^A_i$ and $K^B_i$ that are different from the abort symbol $\perp_i$. The purpose of this second privacy amplification step is to remove the information that the dishonest pairs of KGUs could leak to Eve about say $K^{A'}$. To simplify the discussion, let us consider for instance that the length of all $K^A_i$ and $K^B_i$ is N bits for all i= 1, . . . , M. Also, let us consider for example an adversary structure where at most t<n pairs of units, $KGU^A_i$ and $KGU^B_i$, might be dishonest and actively controlled by Eve. This means that at most t*N bits of $K^{A'}$ could be compromised and known to Eve. Then, the application of a privacy amplification step on $K^{A'}$ and $K^{B'}$ removes this compromised information and results in a final key, $K^A$ and $K^B$, of about (M−t)*N bits. Next we describe the step by step implementation of this specific example. The goal is to generate a secure key in the standard composable setting in cryptography. More concretely, to generate an epsilon-secure key, $K^A$ and $K^B$. That is, $K^A$ and $K^B$ must be both epsilon_cor-correct and epsilon_sec-secret. Epsilon, epsilon_cor and epsilon_sec are design parameter for the key generation system which fulfill epsilon_cor+epsilon_sec≤epsilon (roughly speaking, a key is epsilon_cor-correct if $K^A=K^B$ except for a small probability of at most epsilon_cor. And, a key is epsilon_sec-secret if it is random and secret from an eavesdropper Eve, except for a small failure probability of at most epsilon_sec).

The protocol for secure key generation may comprise the following steps (this is only a possible embodiment, and not all the cited steps are essential and mandatory in all the embodiments of the present invention):

Protocol 1:
1. Distribution of the raw data: Each $KGU^A_i$ sends to $CLPU^A$ the raw key $R^A_i$ or the abort symbol $\perp_i$. Also, each $KGU^B_i$ sends to $CLPU^B$ the raw key $R^B_i$ or the abort symbol $\perp_i$.
2. Generation of an epsilon_cor-correct key $K^{A'}$ and $K^{B'}$: $CLPU^A$ and $CLPU^B$ use a key post-processing protocol to generate a (epsilon_cor/M)-correct and (epsilon_sec/M)-secret key (with epsilon_cor+epsilon_sec≤epsilon), $K^A_i$ and $K^B_i$, from $R^A_i$ and $R^B_i$, or they generate the symbol $\perp_i$ to indicate abort (that is, to indicate that the post-processing procedure was not success and it was not possible to generate a valid key from the raw data) for all i=1, . . . , n. Afterward, $CLPU^A$ concatenates the M keys $K^A_i$ which are different from $\perp_i$ to form $K^{A'}=[K^A_1, K^A_2, \ldots, K^A_M]$. Also, $CLPU^B$ concatenates the keys $K^B_i$ which are different from $\perp_i$ to form $K^{B'}=[K^B_1, K^B_2, \ldots, K^B_M]$.
3. Generation of a epsilon-secure key $K^A$ and $K^B$: $CLPU^A$ and $CLPU^B$ apply a privacy amplification step to extract from $K^{A'}$ and $K^{B'}$ a shorter key, $K^A$ and $K^B$, of length of about (M-t)*N bits. This can be done by using random hashing with a random matrix as explained before or using any other known privacy amplification mechanism.

We remark that Protocol 1 is just a non-limitative example of an embodiment of the invention. For example, note that a naïve method for implementing the additional privacy amplification step which is applied to $K^{A'}$ is simply for Alice to take the bit-wise XOR of the various keys, $K^A_i$ (and similarly for Bob). Also, in general, there is no need to apply privacy amplification in two different steps (i.e., for generating first $K^{A'}$ and $K^{B'}$ and, afterwards, for generating $K^A$ and $K^B$ from $K^{A'}$ and $K^{B'}$) but it could be applied in one single step. That is, one could directly generate an epsilon-secure key, $K^A$ and $K^B$, in one single step from all the raw keys, $R^A_i$ and $R^B_i$, together. Importantly, Protocol 1 illustrates that privacy amplification can be used to guarantee the secrecy of the final key, $K^A$ and $K^B$, in the presence of dishonest KGUs with a prescribed access structure.

C. Scenario 2: A Key Distribution Method with Untrusted Classical Post-Processing Units Inside a Cryptographic Station.

Figure 4:
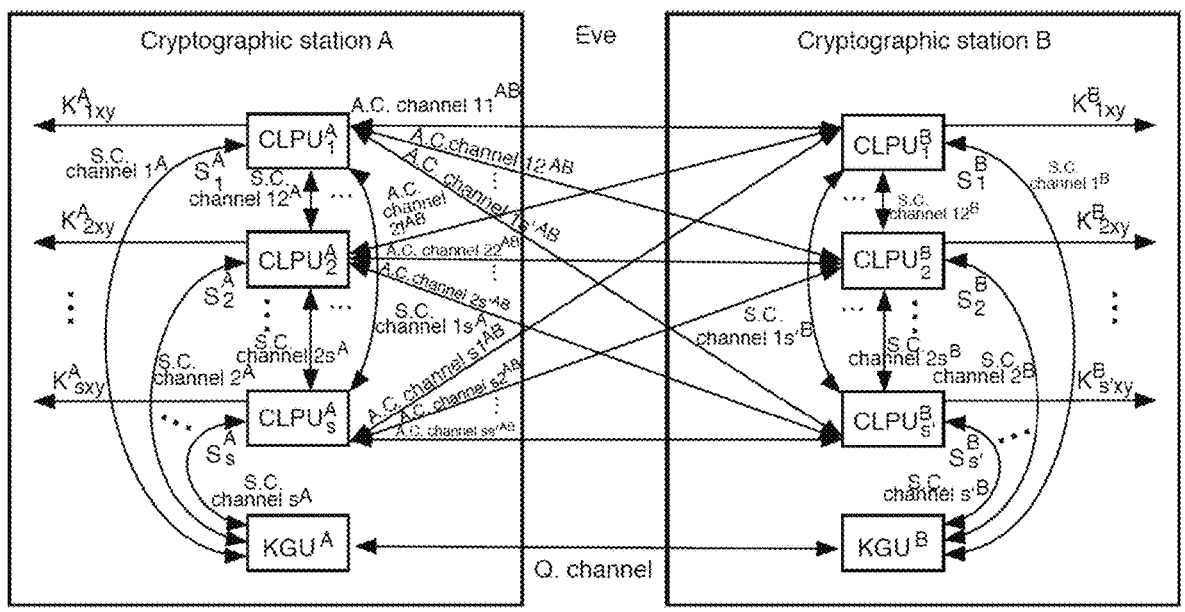
FIG. 4 shows a schematic block diagram of a secure key generation procedure according to one embodiment of the invention, in a scenario where at least one key classical processing unit untrusted.

In this section, it is considered a scenario where some CLPUs in a cryptographic station may be untrusted but the KGUs are trusted. Once again, to improve security, it is considered using multiple CLPUs in a cryptographic station, as shown in FIG. 4. This figure shows two cryptographic stations, A and B, in the presence of an eavesdropper (for example, in the channels that connect the cryptographic stations A and B and also in some of Alice's and Bob's CLPUs, making these CLPUs untrusted CLPUs), Eve. Each cryptographic station contains more than one processing units (known as classical post-processing units, CLPUs). Each CLPU generates shares of a cryptographic key, K.

While the scope of the invention is general and applies to a general adversary structure with dishonest CLPUs which could be passively or actively controlled by Eve, for illustrative purposes, we will describe here the simple threshold case with a fixed number of dishonest CLPUs actively controlled by Eve (however, the invention can be applied to other more complex cases). More concretely, consider the situation where the cryptographic stations A and B have one trusted KGU each, and, moreover, the cryptographic station A has "s" classical post-processing units $CLPU^A_1$, $CLPU^A_2$, . . . , $CLPU^A_s$, and the cryptographic station B has "s'" classical post-processing units $CLPU^B_1$, $CLPU^B_2$, . . . , $CLPU^B_{s'}$. Also, suppose that up to t<s/3, $CLPU^A_i$ and up to t'<s'/3 $CLPU^B_j$ could be dishonest and actively controlled by Eve, with i=1, . . . , s, and j=1, . . . , s'. Note that the various CLPUs could be purchased from different vendors. The present invention allows to construct a secure key generation system with components from untrusted vendors.

Since some CLPUs are dishonest (untrusted), the present invention does not allow them to have the final key, $K^A$ and $K^B$, instead, they are only allowed to produce some shares of the final key, $K^A$ and $K^B$. For instance, in FIG. 4, we denote the shares of $K^A$ generated by $CLPU^A_i$ (for i=1, 2, . . . , s) as $K^A_{i,xy}$, and similarly, we denote the shares of $K^B$ generated by $CLPU^B_j$ (for j=1, 2, . . . , s') as $K^B_{j,xy}$ for certain indexes x and y.

$KGU^A$ is connected to each $CLPU^A_i$ via a secure classical (conventional) channel (denoted as "S.C. channel $i^A$" in FIG. 4), and $KGU^B$ is connected to each $CLPU^B$(conventional) via a secure classical channel (denoted as "S.C. channel $j^B$" in FIG. 4). Moreover, each pair of units $CLPU^A_i$ and $CLPU^A_{i'}$, with i,i'=1, . . . , s, is connected to each other via a secure classical (conventional) channel (denoted as "S.C. channel ii'A" in FIG. 4), and each pair of units $CLPU^B_j$ and $CLPU^B_{j'}$, with j,j'=1, . . . , s', is connected to each other via a secure classical channel (denoted as "S.C. channel jj'$^B$" in FIG. 4). In addition, each pair of units $CLPU^A_i$ and $CLPU^B_j$ is connected to each other via an authenticated classical (conventional) channel (denoted as "A.C. channel ij$^{AB}$" in FIG. 4). Furthermore, in QKD, $KGU^A$ and $KGU^B$ are connected to each other through a quantum channel (denoted as "Q. channel" in FIG. 4), which is accessible to Eve.

In this situation, it is considered a new key distribution protocol where $KGU^A$ sends shares of the generated raw key, $R^A$, to one or more of the $CLPU^A_i$. Similarly, $KGU^B$ sends shares of the raw key, $R^B$, to one or more of the $CLPU^B_j$. In FIG. 4, $S^A_i$ denote the shares of $R^A$ that $KGU^A$ sends to $CLPU^A_i$ and $S^B_j$ are the shares of $R^B$ that $KGU^B$ sends to $CLPU^B_j$. If the cryptographic station A and/or B have more than one KGU, then each KGU might send shares of its raw key to one or more of the CLPUs in that cryptographic station. Next, the units $CLPU^A_i$ and $CLPU^B_j$ post-process the raw key, $R^A$ and $R^B$, in a distributed setting by acting on the shares, $S^A_i$ and $S^B_j$, received and they generate shares, $K^A_{i,1}$, $K^A_{i,2}$, . . . , $K^A_{i,n\_i}$ and $K^B_{j,1}$, $K^B_{j,2}$, . . . , $K^B_{j,m\_j}$, of the final key, $K^A$ and $K^B$. Here n_i denotes the total number of shares of $K^A$ generated by the unit $CLPU^A_i$ and m_j denotes the total number of shares of $K^B$ generated by the unit $CLPU^B_j$. Again, this classical data post-processing may include several steps like, for example, post-selection of data, adding noise, parameter estimation, information reconciliation, and privacy amplification.

To split the raw key, $R^A$ and $R^B$, into shares, the KGUs could use any known method, for instance, secret sharing schemes or verifiable secret sharing schemes. In a secret sharing scheme, the person/device that is splitting the secret is called the dealer. In the case where a dealer might be dishonest, it is important to verify that the values of shares sent by the dealer are consistent with each other. Also, in the presence of dishonest parties, it is important to be able to guarantee that all honest parties can reconstruct the same secret from the shares received, and, moreover, if the dealer is honest, the reconstructed secret should be equal to that originally distributed by the dealer. Such verification can be done by a verifiable secret sharing scheme. In a verifiable secret sharing scheme, a dealer further splits each share into "shares of share" and sends those shares of share to various participants. Those participants may then verify the consistency of the values of those shares of shares.

In the presence of dishonest CLPUs, the use of a verifiable secret sharing scheme can guarantee the consistency of the shares distributed. Therefore, the use of an information reconciliation step (which might include an error verification step) can guarantee the correctness of the final key, $K^A$ and $K^B$.

Below we include the step by step implementation of an example of a verifiable secret sharing scheme from Maurer, U. Secure multi-party computation made simple. Discrete Appl. Math. 154, 370-381 (2006). It uses a (q,q) threshold secret sharing scheme, to distribute a message to n parties. This last scheme could be implemented, for instance, by splitting the message X, to be distributed, into a random sum of q shares $X_i$, with i=1, . . . , q. This could be done, for example, by selecting the first q−1 shares $X_i$ of X at random, and then by choosing $X_q = X \oplus X_1 \oplus \ldots \oplus X_{q-1}$, where the symbol $\oplus$ denotes summation in modulo 2 algebra. A verifiable secret sharing scheme usually can be decomposed into two protocols: the share and the reconstruct protocols. The example of verifiable secret sharing scheme presented below allows to split a message X between n parties, and provides information-theoretic security against a threshold active adversary structure with at most t<n/3 dishonest parties. Again, by (general) adversary structure we mean a set of subsets that identifies which combinations of parties could be passively corrupted, and a set of subsets that identifies which combinations of parties could be actively corrupted. Note that verifiable secret sharing schemes that are secure against general adversary structures also exist. In order to simplify the explanation, it has been assumed here a threshold active adversary structure where at most t parties could be actively corrupted (however, the invention can be applied to other more complex cases). So the example of verifiable secret sharing scheme described above and whose share and reconstruct protocols are given below is secure against such threshold active adversary structure but it is not always secure against general adversary structures. However, if one wishes, one could modify it to make it secure against a general adversary structure. Actually such modification was introduced in the document cited before Maurer, U. Secure multi-party computation made simple. Discrete Appl. Math. 154, 370-381 (2006).

Share Protocol:
1. The dealer uses a (q,q) threshold secret sharing scheme to split the message X into q=n!/[(n−t)!t!] shares $X_i$, with i=1, . . . , q.
2. Let $\{\sigma_1, \ldots, \sigma_q\}$ denote all (n−t)-combinations of the set of n parties. Then, for each i=1, . . . , q, the dealer sends $X_i$ over a secure channel to each party in the set $\sigma_i$. If a party does not receive his share, he takes as default share, for example, a bit string with all its components equal to zero.
3. All pairs of parties in $\sigma_i$ send each other their shares $X_i$ over a secure channel to check that their shares are indeed equal. If an inconsistency is found, they complain using a broadcast channel.
4. If a complaint is raised in ci, the dealer broadcasts $X_i$ to all parties and they accept the share received. If the dealer refuses (or he is not able) to broadcast $X_i$ to all the parties when there is a complaint in ci, the protocol aborts.

Reconstruct Protocol:
1. All pairs of parties send each other their shares over an authenticated classical channel.
2. Each party uses majority voting to reconstruct the shares $X_i$ $\forall i$, and then they obtain $X=X_1 \oplus \ldots \oplus X_q$.

Figure 5:
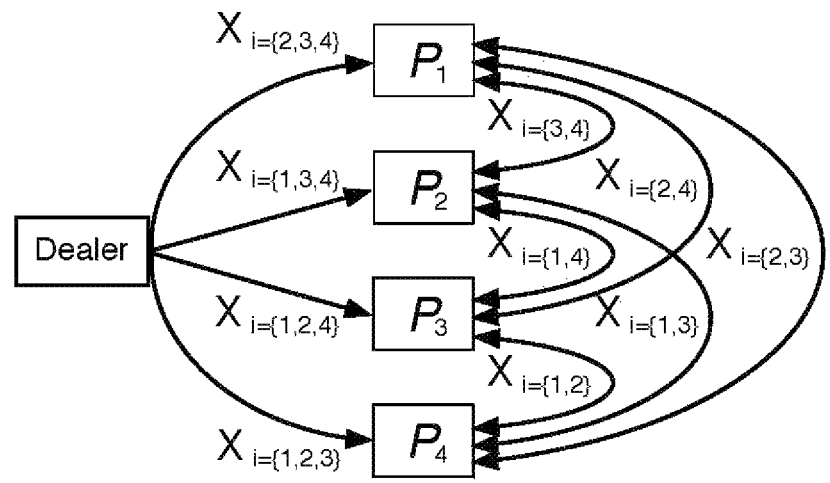
FIG. 5 shows schematic block diagrams illustrating the share and the reconstruct protocols of an example of verifiable secret sharing scheme.
Figure 5:
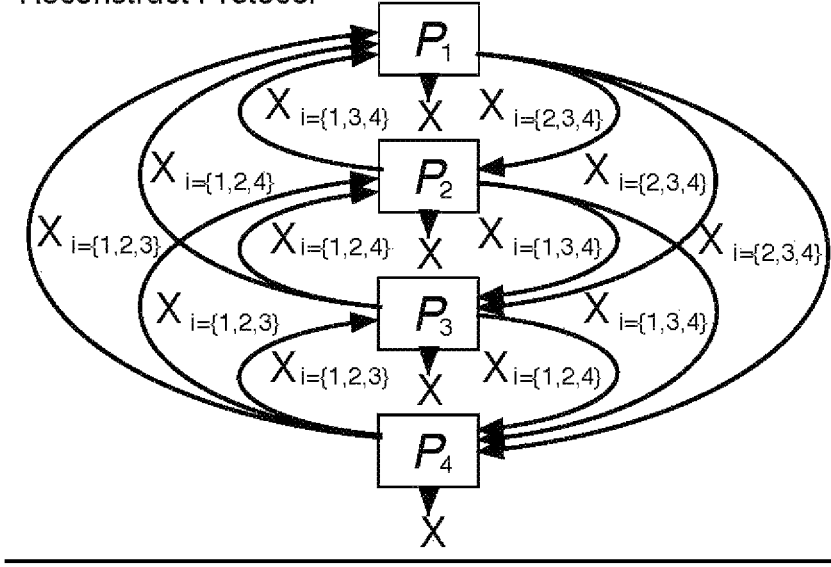

FIG. 5 provides a graphical representation of the share and the reconstruct protocols above explained for the case of a threshold adversary structure where at most 1 out of 4 parties could be dishonest (i.e., n=4 and t=1). In the verifiable secret sharing scheme shown in FIG. 5, the message, X, is split between four parties $P_i$, with i=1, . . . , 4, and provides information-theoretic security against a threshold active adversary structure with at most t=1 dishonest parties. In the figure, $X_{i=\{x,y,z\}}$ denotes the shares $X_x$, $X_y$ and $X_z$ of X. In the share protocol all channels are secure classical (conventional) channels while in the reconstruct protocol the channels are authenticated classical (conventional) channels.

In the case shown in the figure, the sets $\sigma_1=\{P_2, P_3, P_4\}$, $\sigma_2=\{P_1, P_3, P_4\}$, $\sigma_3=\{P_1, P_2, P_4\}$ and $\sigma_4=\{P_1, P_2, P_3\}$, are defined. As q=n!/[(n−t)!t!]=4, the message X has been splitted into 4 shares $X_1$, $X_2$, $X_3$ and $X_4$. Then the dealer sends $X_i$ over a secure channel to all parties in $\sigma_i$. For example, he sends $X_1$ to $P_2$, $P_3$ and $P_4$, and similarly for the other shares.

We note that the broadcast channel which is required to perform steps 3 and 4 of the share protocol above does not have to be a physical channel but it could be a simulated channel.

The above presented verifiable secret sharing scheme is only a non-limitative example and any other known or yet to be developed verifiable secret sharing mechanisms could be used. For example, if the number n of parties is large, there exist other efficient verifiable secret sharing schemes or if a physical broadcast channel is actually available, there exist verifiable secret sharing schemes which can guarantee security given that there is a majority of honest parties (see, for example, Rabin, T. and Ben-Or, M. Verifiable secret sharing and multiparty protocols with honest majority. Proc. 21th Annual ACM Symposium on Theory of Computing (STOC'89) 73-85 (ACM, New York, N.Y., USA, 1989)).

To implement several of the classical post-processing steps which are required to distil a secure key, the CLPUs might need to generate random numbers between mutually untrusted parties. Next we present the step by step implementation of an example of a scheme which could be used to solve this task. It follows directly from verifiable secret sharing schemes and it can generate a common perfectly unbiased random l-bit string r between n parties when up to t<n/3 of them could be dishonest and actively controlled by Eve. For convenience, we denote it the Random Bit String (RBS) protocol.

RBS Protocol:
1. Say each of the first t+1 parties produces locally a random l-bit string $r_i$ and sends it to all the other parties using the share protocol of a verifiable secret sharing scheme.
2. Each party uses a broadcast channel to confirm that it has received the shares from the first t+1 parties. Otherwise, the protocol aborts.

3. All parties use the reconstruct protocol of a verifiable secret sharing scheme to obtain $r_i$ for all i=1, ..., t+1. Afterwards, each of them calculates locally $r = r_1 \oplus \ldots \oplus r_{t+1}$.

Like above, we note that the broadcast channel required in step 2 of the RBS protocol could be implemented with a simulated broadcast channel. Also, note that in order to generate random numbers between mutually untrusted parties which are secure against general adversary structures one could simply use in the RBS protocol above the share protocol (in step 1) and the reconstruct protocol (in step 3) of a verifiable secret sharing scheme that is secure against general adversary structures, like for instance that introduced in Maurer, U. Secure multi-party computation made simple. Discrete Appl. Math. 154, 370-381 (2006).

To illustrate the present invention in this scenario, next we describe two protocols (see Protocols 2 and 3 below) which could be used to achieve secure key distribution with untrusted CLPUs. They are two examples of embodiments of the present invention. For ease of illustration we will consider in these two examples that the number of CLPUs in cryptographic station A is equal to that of B, i.e., s=s', but of course, this is not a required condition and the number of CLPUs in each cryptographic station can be different.

The first example (see Protocol 2 below) can be decomposed in two main conceptual steps. In a first step, $KGU^A$ and $KGU^B$ perform s independent key generation sessions, each of them is performed with a different pair of units $CLPU^A_i$ and $CLPU^B_i$, with i=1, ..., s. The goal of each session is to generate a say (epsilon/s)-secure key, $K^A_i$ and $K^B_i$, or the abort symbol $\perp_i$. For easy of illustration, consider that the length of each $K^A_i$ and $K^B_i$ is N bits for all i. If say the pair $CLPU^A_i$ and $CLPU^B_i$ is dishonest then we have that $K^A_i$ and $K^B_i$ could be compromised and known to Eve. A pair $CLPU^A_i$ and $CLPU^B_i$ is dishonest if at least one of its units is dishonest. Then, in a second step, the keys $K^A_i$ and $K^B_i$ are concatenated to form $K^{A'} = [K^A_1, K^A_2, \ldots, K^A_M]$ and $K^{B'} = [K^B_1, K^B_2, \ldots, K^B_M]$, where M denotes the number of keys $K^A_i$ and $K^B_i$ which are different from the abort symbol, and the CLPUs apply an error verification step and a privacy amplification step to $K^{A'}$ and $K^{B'}$. Here comes a key contribution of this embodiment of the invention: this second step is performed in a distributed setting by acting only on shares of $K^{A'}$ and $K^{B'}$. We remark that this is possible because all these post-processing techniques are usually "linear" in nature (i.e., they typically involve simple functions in linear algebra such as bit-wise XOR and multiplications of matrices) and thus they can be easily implemented by acting only on shares of $K^{A'}$ and $K^{B'}$. In certain steps, the CLPUs might need information about shares which are in the hands of other CLPUs. To obtain such information, they could use for instance the reconstruct protocol of a verifiable secret sharing scheme. That is, all the units which have the information simply send it to the unit which requires it and the use of majority voting allows this unit to discriminate the information which is correct. Next we describe the protocol in more detail:

Protocol 2 (this is only a possible embodiment, and not all the cited steps are essential and mandatory in all the embodiments of the present invention):

1. Generation of $K^A_i$ and $K^B_i$: $KGU^A$ and $KGU^B$ perform s independent key generation sessions, each of which with a different pair of units $CLPU^A_i$ and $CLPU^A_i$, with i=1, ..., s. For this they use the "Q. channel", the "S.C. channel $i^A$", the "S.C. channel $i^B$", and the "A.C. channel $ii^{AB}$" shown in FIG. 4. The result of each key generation session will be two bit strings, $K^A_i$ and $K^B_i$, which are supposed to be say (epsilon_cor/s)-correct and (epsilon_sec/s)-secret (with epsilon_cor+epsilon_sec≤epsilon), or the symbol $\perp_i$ to indicate abort.

2. Distribution of shares of $K^A_i$ and $K^B_i$: Each $CLPU^A_i$ splits $K^A_i$ into shares and sends them to the other CLPUs in cryptographic station A following for example the share protocol of a verifiable secret sharing scheme and using the secure classical channels "S.C. channel $il^A$" shown in FIG. 4, and all $CLPU^A_l$, with l= 1, ..., s and l≠i, confirm to each other that they have received their shares. Let $K'^A_{lij}$ be the j-th share of $K^A_i$ received by $CLPU^A_l$. Likewise, the units $CLPU^B_i$ act similarly with $K^B_i$. Let $K'^B_{lij}$ be the j-th share of $K^A_i$ received by $CLPU^B_l$.

3. Generation of $K''^A_{ij}$ and $K''^B_{lij}$: Each $CLPU^A_l$, with l= 1, ..., s, defines locally the bit strings $K''^A_{lij} = [0_1, \ldots, 0_{i-1}, K'^A_{lij}, 0_{i+1}, \ldots 0_M]$, where $0_i$, with i= 1, ..., M, represents the N-bit zero vector, and M is the number of pairs $CLPU^A_i$ and $CLPU^B_i$ which did not output the abort symbol $\perp_i$. Likewise, the units $CLPU^B_l$ act similarly and they obtain $K''^B_{lij}$.

4. Error verification: The $CLPU^A_l$, with l=1, ..., s, use for example the RBS scheme to select a random bit string and with it they choose at random a two-universal hash function from a pre-fixed set of two-universal hash functions. Then, each of them computes locally a hash $h^A_{lij} = hash(K''^A_{lij})$ of length say $\lceil \log 2 (4/epsilon\_cor) \rceil$ bits for all its bit strings $K''^A_{lij}$, and say the first 2t+1 $CLPU^A_l$ send the hash function to all $CLPU^B_{l'}$ through the authenticated classical channels "A.C. channel $II'^{AB}$" shown in FIG. 4, with l'=1, ..., s. Each $CLPU^B_{l'}$ reconstructs locally the hash function by using majority voting and obtains $h^B_{l'ij} = hash(K''^B_{l'ij})$ for all its bit strings $K''^B_{l'ij}$. Next, all $CLPU^A_l$ and $CLPU^B_{l'}$ use the reconstruct protocol to obtain $h^A = h^A_{11} \oplus \ldots \oplus \beta h^A_{Mq}$ and $h^B = h^B_{11} \oplus \ldots \oplus h^B_{Mq}$, where q=s!/[(s-t)!t!] is the number of shares for each $K^A_i$ and $K^B_i$. For this, they send each other the bit strings $h^A_{lij}$ and $h^B_{l'ij}$ through the channels "A.C. channel $II'^{AB}$", "S.C. channel $II'^A$" and "S.C. channel $II'^B$" shown in FIG. 4, and each of them uses majority voting to obtain $h^A_{ij}$; and $h^B_{ij}$ from $h^A_{lij}$ and $h^B_{l'ij}$. Finally, each $CLPU^A_l$ and $CLPU^B_{l'}$ checks locally that $h^A = h^B$. If they are not equal, they output the abort symbol. If they are equal, they proceed to step 5. This error verification step guarantees that $K''^A = K''^A_{11} \oplus \ldots \oplus K''^A_{Mq}$ and $K''^B = K''^B_{11} \oplus \ldots \oplus K''^B_{Mq}$ are equal except for probability at most epsilon_cor, where $K''^A_{ij}$ denote the bit strings that would be obtained from $K''^A_{lij}$ by using majority voting, and the definition of $K''^B_{ij}$ is analogous.

5. Privacy amplification: The $CLPU^A_l$ use the RBS scheme to randomly select a two-universal hash function, hashPA, from a pre-fixed set of them. They compute $K^A_{lij} = hashPA(K''^A_{lij})$, and say the first 2t+1 $CLPU^A_l$ send hashPA to all $CLPU^B_{l'}$, through the authenticated classical channels "A.C. channel $II'^{AB}$" shown in FIG. 4, with l'=1, ..., s. Next, the $CLPU^B_{l'}$ use majority voting to determine hashPA from the information received and compute $K^B_{l'ij} = hashPA(K''^B_{l'ij})$. The function hashPA maps the (M*N)-bit strings $K''^A_{lij}$ and $K''^B_{l'ij}$ to two shorter bit strings, $K^A_{lij}$ and $K^B_{l'ij}$ respectively, of size about $(M-2*t)*N - \lceil \log 2 (4/epsilon\_cor) \rceil$ bits. The reason for subtracting 2*t*N bits is that, in the worst case scenario, the presence of t dishonest parties $CLPU^A_l$ and t independent dishonest parties $CLPU^B_{l'}$ could result in 2*t dishonest pairs $CLPU^A_l$ and $CLPU^B_{l'}$, with $l=1, \ldots, s$, and, therefore, $2*t*N$ bits from $K''^A$ could be compromised.

Given that $t<M^A_i/3$ and $t<M^B_i/3$ for all $i=1, \ldots, M$, where $M^A_i$ denotes the number of $CLPU^A_l$ that do not produce the abort symbol but generate post-processed shares, $K^A_{lij}$, from $K^A_i$, and $M^B_i$ denotes the number of $CLPU^B_{l'}$ that do not produce the abort symbol but generate post-processed shares, $K^B_{l'ij}$, from $K^B_i$, then the bit strings $K^A_{lij}$ and $K^B_{l'ij}$ produced by the units $CLPU^A_l$ and $CLPU^B_{l'}$, in step 5 of Protocol 2 are shares of a final epsilon-secure key, $K^A$ and $K^B$. As mentioned above, in this scenario the units $CLPU^A_i$ and $CLPU^B_i$ are only allowed to produce shares of $K^A$ and $K^B$. Say a secure lab in cryptographic station A could use majority voting to obtain $K^A_{ij}$ from $K^A_{lij}$. Similarly, say a secure lab in cryptographic station B could use majority voting to obtain $K^B_{ij}$ from $K^B_{l'ij}$. Then, the final key could be obtained as $K^A$ $K^A_{11} \oplus \ldots \oplus K^A_{Mq}$ and $K^B$ $K^B_{11} \oplus \ldots \oplus K^B_{Mq}$.

Next we present the second example of a protocol that can provide secure key distribution with untrusted classical post-processing units (see Protocol 3 below). This protocol has two main advantages with respect to Protocol 2. First, it does not require to run s independent key generation sessions but it can distil an epsilon-secure key from one single key generation run. And, second, it is more efficient in terms of the secret key rate, as it delivers a secret key rate that could be about $s/(s-2*t)$ times higher than that provided by Protocol 2. While the scope of application of the present invention is general, for ease of illustration below we will consider that the key distillation procedure does not use random post-selection of data from the raw key (however, the invention can be applied to other more complex cases where random post-selection of data from the raw key is performed). Also, for ease of illustration it will be assumed that the classical post-processing protocol does not estimate the actual QBER but it uses a pre-fixed QBER value for the error correction step followed by an error verification step. Protocol 3 below can be decomposed in two main conceptual steps. In a first step, $KGU^A$ and $KGU^B$ generate a raw key, $R^A$ and $R^B$ respectively. Next comes a key step in this embodiment of the invention. $KGU^A$ splits $R^A$ in shares by using, for instance, the share protocol of a verifiable secret sharing scheme and then sends these shares to the units $CLPU^A_i$. This step is illustrated in FIG. 4, where $S^A_i$ represents the shares of $R^A$ that are sent to $CLPU^A_i$ through the secure channel "S.C. channel $i^A$". Likewise, $R^B$ is sent to the units $CLPU^B_i$ split into shares. Then, in a second step, each $CLPU^A_i$ and $CLPU^B_{i'}$ with $i,i'=1, \ldots, s$, applies the classical post-processing protocol to the shares received. That is, each CLPU may apply data post-selection, adding noise, parameter estimation, information reconciliation, and privacy amplification in a distributed setting by acting directly on the shares received. Like in the case of steps 4 and 5 in Protocol 2, this is possible because all these post-processing techniques involve simple functions in linear algebra and thus they are easily implementable by acting only on shares. Next we describe the steps of Protocol 3 in more detail:

Protocol 3 (this is only a possible embodiment, and not all the cited steps are essential and mandatory in all the embodiments of the present invention):

1. Distribution of $R^A$ and $R^B$: $KGU^A$ and $KGU^B$ first generate a raw key, $R^A$ and $R^B$. Next, $KGU^A$ uses the share protocol of a verifiable secret sharing scheme to create $q=s!/[(s-t)!t!]$ shares of $R^A$ and then distributes them among the $CLPU^A_i$, with $i=1, \ldots, s$, by using the secure classical channels "S.C. channel $i^A$" shown in FIG. 4. For instance, for this $KGU^A$ can use the share protocol previously described above. Likewise, $KGU^B$ does the same with $R^B$ and the units $CLPU^B_i$ with $i=1, \ldots, s$. Let $K'^A_{ij}$ be the j-th share of $R^A$ received by $CLPU^A_i$ and let $K'^B_{ij}$ be the j-th share of $R^B$ received by $CLPU^B_i$ ($j=1, \ldots, q$). The set of shares $K'^A_{ij}$ received by $CLPU^A_i$ and the set of shares $K'^B_{ij}$ received by $CLPU^B_i$ are represented in FIG. 4 as $S^A_i$ and $S^B_i$ respectively.

2. Post-selection of data: Each $CLPU^A_i$ for all i extracts from the shares $K'^A_{ij}$ received two bit strings: $K'^A_{ij,key}$ and $K'^A_{ij,est}$. The first bit string will be used for key generation (transformed in a secure key thanks to the post-processing) and the second bit string will be used for parameter estimation. Likewise each $CLPU^B_i$ for all i does the same with $K'^B_{ij}$ to obtain $K'^B_{ij,key}$ and $K'^B_{ij,est}$.

3. Parameter estimation: All $CLPU^A_i$ and $CLPU^B_{i'}$, with $i,i'=1, \ldots, s$, use the reconstruct protocol of a verifiable secret sharing scheme to obtain both $K^A_{est}$ and $K^B_{est}$, which are the parts of $K'^A$ and $K'^B$ that are used for parameter estimation. For this, they send each other their shares $K'^A_{ij,est}$ and $K'^B_{i'j,est}$ through the channels "S.C. channel $i^A$", "S.C. channel $i'^B$" and "A.C. channel $ii'^{AB}$" shown in FIG. 4. That is, each unit $CLPU^A_i$ receives the shares $K'^A_{i'j,est}$ and $K^B_{i'j,est}$ which are in the hands of all the other CLPUs. Similarly, each unit $CLPU^B_i$ receives the shares $K'^A_{i'j,est}$ and $K^B_{i'j,est}$ which are in the hands of all the other CLPUs. Then, each of them uses majority voting to obtain both $K^A_{j,est}$ and $K^B_{j,est}$ from $K'^A_{ij,est}$ and $K'^B_{ij,est}$ for all $j=1, \ldots, q$. Afterward, they calculate $K^A_{est}=K^A_{1,est} \oplus \ldots \oplus K^A_{q,est}$ and $K^B_{est}=K^B_{1,est} \oplus \ldots \oplus K^B_{q,est}$. With this information, each $CLPU^A_i$ and $CLPU^B_{i'}$ performs locally the parameter estimation step of the protocol (e.g., they estimate the phase error rate). If the phase error is too high, an abort symbol is outputted.

4. Error Correction: The $CLPU^A_i$ and $CLPU^B_i$ perform error correction on the parts of $K'^A$ and $K'^B$ that are used for key distillation, $K'^A_{key}$ and $K'^B_{key}$. This process is done by acting on their shares $K'^A_{ij,key}$ and $K'^B_{ij,key}$ respectively. For this, each $CLPU^A_i$ applies certain matrices $M_{EC}$ to $K^A_{ij,key}$ to obtain $s^A_{ij}=M_{EC}*K'^{ij,key}_A$. Similarly, each $CLPU^B_i$ applies $M_{EC}$ to $K'^B_{ij,key}$ to obtain $s^B_{ij}=M_{EC}*K'^z_{ij,key}$. Afterward, $CLPU^A_i$ and $CLPU^B_i$ use the reconstruct scheme of a verifiable secret sharing scheme to guarantee that all $CLPU^B_i$ can obtain $s^A=M_{EC}*K'^A_{key}$ and $s^B=M_{EC}*K'^B_{key}$. For this, all $CLPU^A_i$ send to all $CLPU^B_{i'}$ the bit strings $s^A_{ij}$ via the authenticated classical channel "A.C. channel $ii'^{AB}$" shown in FIG. 4. Also, all $CLPU^B_i$ in cryptographic station B send each other the bit strings $S^B_{ij}$ via the "S.C. channel $ii'B$" shown in FIG. 4. Then, each $CLPU^B_i$ uses majority voting to reconstruct locally $S^A_j$ and $s^B_j$, for all j, from $S^A_{ij}$ and $s^B_{ij}$. Finally, they obtain $S^A=s^A_1 \oplus \ldots \oplus s^A_q$ and $s^B=s^B_1 \oplus \ldots \oplus s^B_q$. Next, the CLPUs in cryptographic station B correct $K'^B_{key}$. For this, say all $CLPU^B_i$ which have for instance the j-th share $K'^B_{ij,key}$ of $K'^B_{key}$ for a pre-fixed index $j=1, \ldots, q$, flip certain bits of this share depending on the value of $S^A$ and $s^B$. This whole process is repeated until the error correction procedure ends. The end of the error correction procedure is determined by the particular error correction protocol implemented as well as by the value of the QBER. Let $K^A_{ij,key}$ and $K^B_{ij,key}$ denote the shares $K'^A_{ij,key}$ and $K'^B_{ij,key}$ after error correction, and let $leak_{EC}$ bits be the syndrome information. Here syndrome information refers to the information that the CLPUs at one cryptographic station send to the CLPUs at the other cryptographic station (and vice versa) during this error correction process. For example, in each iteration of error correction the CLPUs at cryptographic station A send $|s^A|$ bits of syndrome information to the CLPUs at cryptographic station B.

5. Error verification: The $CLPU^A_i$, with i=1, . . . , s, use the RBS scheme to randomly select a two-universal hash function. Then, each of them computes locally a hash $h^A_{ij}$=hash($K^A_{ij,key}$) of length say $\lceil \log 2 (4/\text{epsilon\_cor})\rceil$ bits and say the first 2t+1 $CLPU^A_i$ send the hash function to all $CLPU^B_{i'}$, with i'=1, . . . , s, through the authenticated classical channels "A.C. channel $ii'^{AB}$" shown in FIG. 4. Each $CLPU^B_i$ reconstructs locally the hash function by using majority voting and obtains $h^B_{ij}$=hash($K^B_{ij,key}$). Next, all $CLPU^A_i$ and $CLPU^B_i$ use the reconstruct protocol of a verifiable secret sharing scheme to obtain both $h^A$= $h^A_1 \oplus \ldots \oplus h^A_q$ and $h^B$=$h^B_1 \oplus \ldots \oplus h^B_q$ from $h^A_{ij}$ and $h^B_{ij}$. For this, they send each other $h^A_{ij}$ and $h^B_{ij}$ through the channels "A.C. channel $ii'^{AB}$", "S.C. channel $ii'^A$" and "S.C. channel $ii'^B$" shown in FIG. 4 with i,i'= 1, . . . , s. That is, each unit $CLPU^A_{i'}$ receives the shares $h^A_{ij}$ and $h^B_{ij}$ which are in the hands of all the other CLPUs. Similarly, each unit $CLPU^B_{i'}$ receives the shares $h^A_{ij}$ and $h^B_{ij}$ which are in the hands of all the other CLPUs. Then, each of them uses majority voting to determine both $h^A_j$ and $h^B_j$ for all j from $h^A_{ij}$ and $h^B_{ij}$. Finally, each of them checks locally whether or not $h^A$=$h^B$. If they are not equal, they output the abort symbol. If they are equal they proceed to step 6. This error verification step guarantees that $K'^A_{key}$= $K^A_{1,key} \oplus \ldots \oplus K^A_{q,key}$ and $K'^B_{key}$= $K^B_{1,key} \oplus \ldots \oplus K^B_{q,key}$ are equal except for probability at most epsilon\_cor, where $K^A_{j,key}$ and $K^B_{j,key}$ denote, respectively, the bit strings that would be obtained from $K^A_{j,key}$ and $K^B_{ij,key}$ by using majority voting.

6. Privacy amplification: The $CLPU^A_i$ use for instance the RBS protocol to randomly select a two-universal hash function, hashPA. Next, they compute $K^A_{ij}$=hashPA ($K^A_{ij,key}$), and say the first 2t+1 $CLPU^A_i$ send hashPA to all $CLPU^B_{i'}$, through the authenticated classical channels "A.C. channel $ii'^{AB}$" shown in FIG. 4, with i'= 1, . . . , s. Next, the $CLPU^B_i$ use majority voting to determine hashPA from the information received and calculate $K^B_{ij}$=hashPA($K^B_{ij,key}$). The function hashPA removes Eve's partial information on the final key, $K^A$ and $K^B$, which includes the syndrome information $\text{leak}_{EC}$ disclosed during the information reconciliation step, the hash value disclosed during the error verification step, and Eve's information about the key which can be estimated from the phase error rate.

We note that if the number of dishonest units $CLPU^A_i$ satisfies t<$M_A$/3 and the number of dishonest units $CLPU^B_i$ satisfies t<$M_B$/3, where $M_A$ is the number of units $CLPU^A_i$ that do not abort and $M_B$ is the number of units $CLPU^B_i$ that do not abort, then from the bit strings $K^A_{ij}$ and $K^B_{ij}$ produced in step 6 of Protocol 3 it is possible to reconstruct an epsilon-secure key, $K^A$ and $K^B$. For this, say a secure lab in cryptographic station A could use majority voting to obtain $K^A_j$ from $K^A_{ij}$ for all j=1, . . . , q. Similarly, say a secure lab in cryptographic station B could use majority voting to obtain $K^B_j$ from $K^B_{ij}$ for all j=1, . . . , q. Then, $K^A$= $K^A_1 \oplus \ldots \oplus K^A_q$ and $K^B$=$K^B_1 \oplus \ldots \oplus K^B_q$.

We remark that Protocols 2 and 3 are just non-limitative examples of embodiments of the invention. Note that these protocols could be modified to guarantee security against general adversary structures. For this, one could basically replace the verifiable secret sharing scheme above which is secure against threshold active adversary structures with another known one robust against general adversary structures (see, for example, Maurer, U. Secure multi-party computation made simple. Discrete Appl. Math. 154, 370-381 (2006)), and, in addition, the method to announce the hash functions hash and hashPA may now depend on the adversary structure. Importantly, Protocols 2 and 3 highlight a key contribution of the present invention, which is that the use of secret sharing schemes could guarantee the security of key distribution in the presence of dishonest CLPUs.

D. Scenario 3: A Key Generation Method with Untrusted Key Generation Units and Untrusted Classical Post-Processing Units in a Cryptographic Station.

Figure 6:
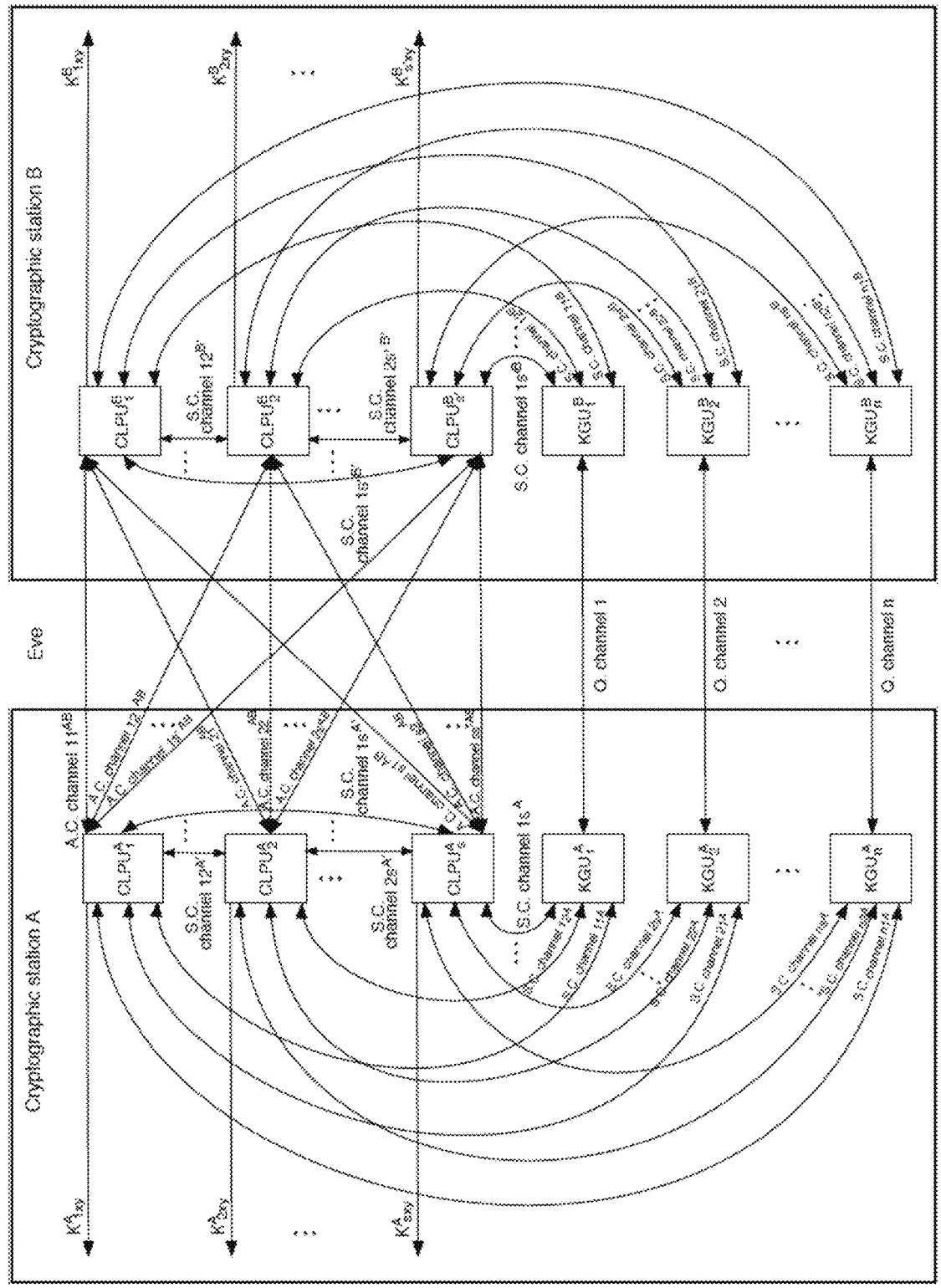
FIG. 6 shows a schematic block diagram of a secure key generation procedure according to an embodiment of the invention, in a scenario where each cryptographic station contains more than one key generation unit, KGU, and more than one classical post-processing unit, CLPU.

Here, it is considered the more general scenario (preferred embodiment of the invention), in which both the KGUs and the CLPUs in a cryptographic station may be untrusted. Again, to guarantee security multiple CLPUs and KGUs are used in each cryptographic station, as shown in FIG. 6, where there are two cryptographic stations, A and B, in the presence of an eavesdropper, Eve, and each cryptographic station contains more than one key generation unit, KGU, and more than one classical post-processing unit, CLPU. Like in the previous scenarios, for illustrative purposes below we will describe the simple situation of a threshold active adversary structure with a fixed number of dishonest KGUs and CLPUs both of them actively controlled by Eve. More precisely, consider the situation where the cryptographic station A has n units $KGU^A_1$, $KGU^A_2$, . . . , $KGU^A_n$, as well as s units $CLPU^A_1$, $CLPU^A_2$, . . . , $CLPU^A_s$, and the cryptographic station B has n units $KGU^B_1$, $KGU^B_2$, . . . , $KGU^B_n$ and s' units $CLPU^B_1$, $CLPU^B_2$, . . . , $CLPU^B_{s'}$ (here it is supposed that station A and B have the same number of KGUs but this is only an example for illustration purposes and they may have a different number of KGUs). Also, consider that up to t<s/3 units $CLPU^A_l$, up to t'<s'/3 units $CLPU^B_j$, and up to t"<n pairs of key generation units $KGU^A_i$ and $KGU^B_i$ with i=1, . . . , n, could be dishonest (untrusted) and actively controlled by Eve. A pair of units $KGU^A_i$ and $KGU^B_i$ is dishonest if at least one of its units is dishonest. This is only a non-limitative example and, of course, the invention can be applied to any general adversary structure.

Once again, since some CLPUs are dishonest, it is not allowed for any of them to have the final cryptographic key, $K^A$ and $K^B$, but they can only produce shares of it. For instance, in FIG. 6, the shares of $K^A$ which are produced by $CLPU^A_l$ (for l=1, 2, . . . , s) are denoted by $K^A_{lxy}$ for certain indexes x and y and, similarly, the shares of $K^B$ which are produced by $CLPU^B$ (for j=1, 2, . . . , s') are denoted by $K^B_{jxy}$. Also, like in the previous cases, we consider that each $KGU^A_i$ is connected to each $CLPU^A_l$ via a secure classical (conventional) communication channel (denoted as "S.C. channel $il^A$" in FIG. 6), with i=1, . . . , n and l=1, . . . , s, each $KGU^B_i$ is connected to each $CLPU^B_j$ via a secure classical (conventional) communication channel (denoted as "S.C. channel $ij^B$" in FIG. 6), with j=1, . . . , s', each pair of units $CLPU^A_I$ and $CLPU^A_{I'}$, with I,I'=1, . . . , s, is connected to each other via a secure classical (conventional) communication channel (denoted as "S.C. channel $II'^A$" in FIG. 6), each pair of units $CLPU^B_j$ and $CLPU^B_{j'}$, with j,j'=1, . . . , s', is connected to each other via a secure classical (conventional) communication channel (denoted as "S.C. channel $jj'^B$" in FIG. 6), each pair of units $CLPU^A_l$ and $CLPU^B_j$ is connected to each other via an authenticated classical (conventional) communication channel (denoted as "A.C. channel $lj^{AB}$", in FIG. 6), and, in QKD, each pair of units $KGU^A_i$ and $KGU^B_i$ are connected to each other through a quantum channel (denoted as "Q. channel i" in FIG. 6 with i= 1, . . . , n), which is accessible to Eve.

In order to illustrate the invention, below it is described an example of a protocol (see Protocol 4) which could be used to achieve secure key distribution in this scenario according to the present invention. For ease of illustration, in this example we consider that the number of CLPUs in cryptographic station A is equal to that of B, i.e., s=s' (this is only an example for illustration purposes and they may have a different number of CLPUs). Protocol 4 can be decomposed in two main conceptual steps. In a first step, each pair of units $KGU^A_i$ and $KGU^B_i$ generates a raw key and then they implement, together with the classical post-processing units $CLPU^A_l$ and $CLPU^B_l$, the Protocol 3 described above. As a result, the units $CLPU^A_l$ and $CLPU^B_l$, with l=1, . . . , s, obtain shares of an (epsilon/n)-secure key, $K^A_i$ and $K^B_i$ (i=1, . . . , n), or the abort symbol $\perp_i$. In particular, let $K'^A_{lij}$ be the j-th share of $K^A_i$ received by $CLPU^A_l$, and similarly let $K'^B_{lij}$ be the j-th share of $K^B_i$ received by $CLPU^B_l$. Moreover, to simplify the discussion (but not with limitative purposes), let us consider for instance that the length of all $K^A_i$ and $K^B_i$ is N bits for all i. Next the CLPUs proceed similarly to Protocol 2. That is, the keys $K^A_i$ and $K^B_i$ are concatenated to form $K^{A'}=[K^A_1, K^A_2, \ldots, K^A_M]$ and $K^{B'}=[K^B_1, K^B_2, \ldots, K^B_M]$, where M denotes the number of keys $K^A_i$ and $K^A_i$ which are different from the abort symbol, and the CLPUs apply a privacy amplification step to $K^{A'}$ and $K^{B'}$. This privacy amplification step removes the information that the dishonest pairs of KGUs could leak to Eve about say $K^{A'}$. This second step is performed in a distributed setting by acting only on the shares $K'^A_{lij}$ and $K'^B_{lij}$. Next the protocol is described in more detail:

Protocol 4 (this is only a possible embodiment, and not all the cited steps are essential and mandatory in all the embodiments of the present invention):

1. Generation and distribution of shares of $K^A_i$ and $K^B_i$: Each pair $KGU^A_i$ and $KGU^B_i$, with i=1, . . . , n, generates a raw key and then they implement, together with the classical post-processing units $CLPU^A_l$ and $CLPU^B_l$, all the steps of the Protocol 3 described above. As a result, the units $CLPU^A_l$ and $CLPU^B_l$, with l= 1, . . . , s, obtain shares of a (epsilon/n)-secure key, $K^A_i$ and $K^B_i$, or the symbol $\perp_i$ to indicate abort. Let $K'A_{lij}$ be the j-th share of $K^A_i$ received by $CLPU^A_l$, and similarly let $K'^B_{lij}$ be the j-th share of $K^B_i$ received by $CLPU^B_l$.

2. Generation of $K''^A_{lij}$ and $K''^B_{lij}$: Each $CLPU^A_l$, with l= 1, . . . , s, defines locally the bit strings $K''^A_{lij}=[0_1, \ldots, 0_{i-1}, K^A_{lij}, 0_{+i+1}, \ldots, 0_M]$, where $0_i$, with i= 1, . . . , M, represents the N-bit zero vector, and M is the number of keys $K^A_i$ and $K^B_i$ which are different from the abort symbol $\perp_i$. Likewise, the units $CLPU^B_l$ act similarly and they obtain $K''^B_{lij}$.

3. Privacy amplification: The $CLPU^A_l$ use the RBS scheme to randomly select a two-universal hash function, hashPA. They compute $K^A_{lij}=hashPA(K''^A_{lij})$, and say the first 2t+1 $CLPU^A_l$ send hashPA to all $CLPU^B_l$, through the authenticated classical channels "A.C. channel II'$^{AB}$" shown in FIG. 6, with l'=1, . . . , s. Next, the $CLPU^B_{l'}$ use majority voting to determine hashPA from the information received and compute $K^B_{l'ij}=hashPA(K''^B_{l'ij})$. The function hashPA maps the (M*N)-bit strings $K''^A_{lij}$ and $K''^B_{l'ij}$ to two shorter bit strings, $K^A_{lij}$ and $K^B_{l'ij}$ respectively, of size about (M−t'')*N bits.

Given that $t<M^A_i/3$ and $t'<M^B_i/3$ for all i=1, . . . , M, where $M^A_i$ denotes the number of $CLPU^A_l$ that do not produce the abort symbol but generate post-processed shares, $K^A_{lij}$, from $K^A_i$, and $M^B_i$ denotes the number of $CLPU^B_{l'}$ that do not produce the abort symbol but generate post-processed shares, $K^B_{l'ij}$, from $K^B_i$, then a final epsilon-secure key, $K^A$ and $K^B$, can be reconstructed from the shares $K^A_{lij}$ and $K^B_{l'ij}$ by following the same procedure that reconstructs the final key in Protocol 2. We remark that Protocol 4 is just an example of an embodiment of the invention. By following similar ideas, one could define alternative protocols that also allow secure key distribution in this scenario. For instance, one could replace the first step of Protocol 4 with an step where each group of units $KGU^A_i$, $KGU^B_i$, $CLPU^A_i$ and $CLPU^B_i$, with i=1, . . . , n, first performs a key generation session to produce a epsilon-secure key, $K^A_i$ and $K^B_i$, or the abort symbol $\perp_i$, followed by the distribution of $K^A_i$ among all $CLPU^A_l$ and the distribution of $K^B_i$ among all $CLPU^B_l$, by using the share protocol of a verifiable secret sharing scheme. In this last case, to guarantee the correctness of the final, one could include an error verification step implemented in a distributed setting by acting on shares. Also, we remark that Protocol 4, and similar protocols, could be modified to guarantee security against general adversary structures by following the techniques explained for the two previous cases. Importantly, the example given by Protocol 4 illustrates one key contribution of the invention, that is, the combination of secret sharing schemes and privacy amplification techniques could guarantee secure key distribution with dishonest KGUs and CLPUs.

Summarizing, it can be said that the main goal of the present invention is to obtain a secure key generation system with components purchased/made by various untrusted vendors. The invention can be used to defend against both untrusted key generation units (KGUs) and untrusted classical post-processing units (CLPUs). Moreover, the present invention has the advantage of being robust against a denial-of-service attack as trust is distributed across multiple KGUs that could be using entirely different channels.

For simplicity, the invention has so far been discussed for specific examples where there are only two users. It should be noted that it can be applied to a network setting where there are multiple users (and therefore multiple cryptographic stations). Also, it can be applied to a network setting where the multiple users are connected to each other through multiple paths, and it allows the users to combine the multiple keys generated from the multiple paths into a final key that is secure against untrusted devices and it is also secure against compromised paths that contain nodes which are controlled by the eavesdropper. In addition, for simplicity, we have assumed that each user is located physically in just one local cryptographic station. It should be noted that what we draw as a single cryptographic station in FIGS. 3, 4 and 6 could potentially be a collection of physical nodes that are distributed in distant locations in a communication network.

The invention can be combined with both trusted relays and untrusted relays. Also, the invention may apply to a measurement-device-independent QKD set-up where an untrusted intermediate, Charles, performs some measurements (e.g. Bell state measurements) on quantum states sent by cryptographic stations of Alice and Bob. Moreover, the invention can be combined with quantum repeaters.

The invention can be combined with various classical post-processing protocols including post-selection protocols or, as already mentioned previously, adding noise protocols.

The invention is compatible with various QKD protocols including, for example, decoy state QKD, COW protocol, RR-DPS QKD protocol and entanglement-based QKD. It applies as well to various encoding schemes and to both discrete variable and continuous variable schemes for key generation.

Even though we have discussed our invention in the composable security framework (where a protocol can be combined with other protocols in an arbitrary manner), the present invention works also for other security frameworks including one that involves computational assumptions.

While the invention has been described with reference to the preferred and alternative embodiments thereof, it will be appreciated that various modifications can be made to the parts and methods that comprise the invention without departing from the spirit and scope thereof.

A person skilled in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. Although the present invention has been described with reference to specific embodiments, it should be understood by those skilled in the art that the foregoing and various other changes, omissions and additions in the form and detail thereof may be made therein without departing from the scope of the invention as defined by the following claims.

Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A method for secure cryptographic keys generation in a presence of untrusted units in a cryptographic system, the system comprising:
   a first cryptographic station A and a second cryptographic station B,
   where each cryptographic station comprises n raw data generation units, $KGU^A_i$, $KGU^B_i$ with i=1, 2, ..., n, where n>1, and at least one post-processing unit $CLPU^A$ $CLPU^B$, respectively,
   where the method comprises:
      each pair of raw data generation units, $KGU^A_i$, and $KGU^B_i$, with i=1, 2, ..., n, generating a pair of data strings which are correlated to each other and sending the generated data string by $KGU^A_i$ to the at least one post-processing unit of the first cryptographic station and sending the generated data string by $KGU^B_i$ to the at least one post-processing unit of the second cryptographic station;
      the at least one post-processing units of the first and second cryptographic stations, $CLPU^A$, $CLPU^B$:
      applying a post-processing procedure to each received data string for generating a cryptographic key, $K^A_i$, $K^B_i$ or an error symbol for each respective raw data generation unit,
   where the post-processing procedure includes at least one information reconciliation operation between the post-processing units of both cryptographic stations via an authenticated communication channel and a first privacy amplification procedure;
   concatenating the generated cryptographic keys to form a first concatenated cryptographic key $K^{A'}=[K^A_1, K^A_2, ..., K^A_M]$ and a second concatenated cryptographic key $K^{B'}=[K^B_1, K^B_2, ..., K^B_M]$ where M is a number of pairs of generated cryptographic keys in both cryptographic stations which are different from the error symbol;
   applying an additional privacy amplification procedure operation to the first concatenated cryptographic key and to the second concatenated cryptographic key to extract a first and a second secure cryptographic keys respectively, $K^A$ and $K^B$,
   wherein $K^A$ and $K^B$ are shorter in length than $K^{A'}$ and $K^{B'}$, respectively,
   wherein $K^A$ and $K^B$ are securely generated in the presence of at least one untrusted raw data generation units, $KGU^A_i$, and $KGU^B_i$.

2. The method according to claim 1 wherein the pair of data strings generated by each pair of raw data generation units, $KGU^A_i$ and $KGU^B_i$, i=1, 2, ..., n, of the first and second cryptographic stations respectively, are generated using a quantum key distribution mechanism.

3. A method for secure cryptographic keys generation in a presence of untrusted units in a cryptographic system, the system comprising:
   a first cryptographic station A and a second cryptographic station B, where each cryptographic station comprises at least one raw data generation unit, $KGU^A$, $KGU^B$ and more than one post-processing units $CLPU^A_l$, $CLPU^B_{l'}$, l=1, 2, ..., s, l'=1, 2, ... s', respectively, where the method comprises:
      $KGU^A$ generating s data strings and sending one generated data string to each $CLPU^A_l$ and
      $KGU^B$ generating s' data strings which are correlated to the data strings generated by $KGU^A$ and sending one generated data string to each $CLPU^B_{l'}$;
      each post-processing unit of the first and second cryptographic stations:
      applying a post-processing procedure to each received data string for generating a cryptographic key or an error symbol for each received data string,
   where the post-processing procedure includes at least one information reconciliation operation between the post-processing units of both cryptographic stations via an authenticated communication channel and a first privacy amplification procedure;
   dividing the generated cryptographic keys into two or more shares and distributing them among the rest of post-processing units of the first and second cryptographic stations respectively;

generating a share of a secure cryptographic key by applying an error verification procedure and an additional privacy amplification procedure operation to the received cryptographic keys shares to extract keys that are shorter in length than a concatenation of the received cryptographic keys shares, wherein the keys are securely generated in the presence of at least one untrusted post-processing units $CLPU^A_i$, $CLPU^B_i$, wherein the extracted keys are not accessible to the untrusted post-processing units $CLPU^A_i$, $CLPU^B_i$.

4. The method according to claim 3 wherein each pair of data strings generated by each pair of raw data generation units $KGU^A$ and $KGU^B$ of the first and second cryptographic stations respectively are generated using a quantum key distribution mechanism.

5. A method for secure cryptographic keys generation in a presence of untrusted units in a cryptographic system, the system comprising:
 a first cryptographic station A and a second cryptographic station B, where each cryptographic station comprises at least one raw data generation unit, $KGU^A$, $KGU^B$ and more than one post-processing units $CLPU^A_i$, $CLPU^B_{i'}$, i=1, 2, . . . , s, i'=1, 2, . . . s', respectively,
 where the method comprises:
  the at least one raw data generation units in the first and second cryptographic stations generating a data string, $R^A$, $R^B$ respectively which are correlated to each other,
  dividing the generated data strings into two or more shares and distributing them among the post-processing units of the first and second cryptographic stations respectively where $K'A_{ij}$ is the j-th share of $R^A$ received by $CLPU^A_i$ and $K'B_{ij'}$ is the j'-th share of $R^B$ received by $CLPU^B_i$;
  each post-processing unit of the first and second cryptographic stations:
   obtaining from each received share of the data strings a key generation sub-string share $K'^A_{ij,key}$, $K'^B_{i'j',key}$, which is a subset of its respective share;
   applying a post-processing procedure to the key generation sub-strings shares for generating secure cryptographic key shares,
  where said post-processing procedure includes at least one information reconciliation operation between the post-processing units of both cryptographic stations via an authenticated communication channel and a privacy amplification procedure to extract keys shorter in length than $K'A_{ij}$ and $K'B_{ij',key}$,
 wherein the extracted keys are securely generated in the presence of at least one untrusted post-processing units $CLPU^A_i$, $CLPU^B_i$,
 wherein the extracted keys are not accessible to the untrusted post-processing units $CLPU^A_i$, $CLPU^B_i$.

6. The method according to claim 5,
 wherein the information reconciliation operation includes an error correction procedure which comprises:
 applying in each post-processing unit of the first and second cryptographic stations predefined matrices $M_{EC}$ to the key generation sub-strings shares for obtaining data strings $s^A_{ij}=M_{EC}*K'^A_{ij,key}$, $s^B_j=M_{EC}*K'^B_{ij',key}$ respectively;
 obtaining in each post-processing unit of the first and second cryptographic stations a reconstructed data string $s^A$, $s^B$ defined as $s^A=^A_1 \oplus \ldots \oplus^A_q$ and $s^B = s^B_1 \oplus \ldots \oplus s^B_{q'}$, respectively, where $S^A_j$, j=1, 2, . . . , q, is obtained from $s^A_{ij}$ by using majority voting on q shares and $S^B_{j'}$, j'=1, 2, . . . , q', is obtained from $s^B_{ij'}$ by using majority voting on q' shares;
 modifying a value of the key generation sub-strings $K'^A_{ij,key}$, $K'^B_{i'j',key}$ depending on values of $s^A$ and $s^B$;
 repeat the error correction procedure until the error is below a predefined threshold;
 where the information reconciliation operation includes an error verification procedure which comprises:
 the post-processing units of the first cryptographic station randomly selecting a two-universal hash function, hash, and applying it to the key generation sub-strings shares obtained after the error correction procedure, $K'^A_{ij,key}$, obtaining $h^A_{ij}$=hash($K'^A_{ij,key}$), and each post-processing unit of the second cryptographic station obtaining $h^B_{ij}$=hash($K^B_{i'j',key}$) and each post-processing unit sending the shares $h^A_{ij}$ and $h^B_{ij'}$ to all the post-processing units in its own cryptographic station and to all the post-processing units in the other cryptographic station;
 obtaining in each post-processing unit a reconstructed data string $h^A$, $h^B$ respectively as $h^A=h^A_1 \oplus \ldots \oplus h^A_q$ and $h^B=h^B_1 \oplus \ldots \oplus h^B_{q'}$, where $h^A_j$=1, 2, . . . , q, is obtained from $h^A_{ij}$ by using majority voting on q shares and $h^B_j$, j'=1, 2, . . . , q, is obtained from $h^B_{ij'}$ by using majority voting on q' shares;
 each of the post-processing units checking whether or not $h^A=h^B$ and when they are equal they proceed to the privacy amplification procedure, otherwise outputting an abort symbol;
 where the privacy amplification procedure comprises:
 the post-processing units of the first cryptographic station randomly selecting a two universal hash function hashPA, and then obtaining shares of a secure cryptographic key as $K^A_{ij}$=hashPA ($K'^A_{ij,key}$) and each post-processing unit of the second cryptographic station obtaining shares of a secure cryptographic key as $K^B_{i'j'}$=hashPA ($K^B_{i'j',key}$).

7. The method according to claim 5, wherein the method further includes:
 each post-processing unit of the first and second cryptographic stations, obtaining from each received share of the data strings, a parameter estimation sub-string share $K'^A_{ij,est}$, $K'^B_{i'j',est}$ and sending said parameter estimation sub-strings shares to all post-processing units in the first and second cryptographic stations.

8. A system for secure cryptographic keys generation in a presence of untrusted units, the system comprising:
 a first cryptographic station A and a second cryptographic station B, where each cryptographic station comprises n raw data generation units, $KGU^A_i$, $KGU^B_i$, with i=1, 2, . . . , n, where n>1, and at least one post-processing unit $CLPU^A$, $CLPU^B$, respectively, wherein $KGU^A_j$, $KGU^B_j$, $CLPU^A$ and $CLPU^B$ are physical units or program units executed on physical processors in their respective cryptographic station, wherein:
 each pair of raw data generation units, $KGU^A_i$ and $KGU^B_i$, comprising means for generating a pair of data strings which are correlated to each other and sending the generated data string by $KGU^A_i$, to the at least one post-processing unit of the first cryptographic station and sending the generated data string by $KGU^B_i$, to the at least one post-processing unit of the second cryptographic station;

the at least one post-processing units of the first and second cryptographic stations, $CLPU^A$, $CLPU^B$ being configured for:

applying a post-processing procedure to each received data string for generating a cryptographic key, $K^A_j$, $K^B_j$, or an error symbol for each respective raw data generation unit, where the post-processing procedure includes at least one information reconciliation operation between the post-processing units of both cryptographic stations via an authenticated communication channel and a first privacy amplification procedure;

concatenating the generated cryptographic keys to form a first concatenated cryptographic key $K^{A'}=[K^A_1, K^A_2 \ldots K^A_M]$ and a second concatenated cryptographic key $K^{B'}=[K^B_1, K^B_2 \ldots K^B_M]$ where M is a number of pairs of generated cryptographic keys in both cryptographic stations which are different from the error symbol;

applying an additional privacy amplification procedure operation to the first concatenated cryptographic key and to the second concatenated cryptographic key to extract a first and a second secure cryptographic keys respectively, $K^A$ and $K^B$, wherein $K^A$ and $K^B$ are shorter in length than $K^{A'}$ and $K^{B'}$, respectively, wherein $K^A$ and $K^B$ are securely generated in the Presence of at least one untrusted raw data generation units, $KGU^A_i$, and $KGU^B_{i'}$.

9. A system for secure cryptographic keys generation in a presence of untrusted units, the system comprising:

a first cryptographic station A and a second cryptographic station B, wherein each cryptographic station comprises at least one raw data generation unit, $KGU^A$, $KGU^B$ respectively and more than one post-processing units $CLPU^A_I$, $CLPU^B_{I'}$, I=1, 2, ..., s, I'=1, 2 ...,s', wherein $KGU^A$, $KGU^B$, $CLPU^A_I$, and $CLPU^B_{I'}$ are physical units or program units executed on physical processors in their respective cryptographic station, wherein:

$KGU^A$ comprising means for generating s data strings and sending one generated data string to each $CLPU^A_I$ and $KGU^B$ comprising means for generating s' data strings which are correlated to the data strings generated by $KGU^A$ and sending one generated data string to each $CLPU^B_{I'}$;

each post-processing unit of the first and second cryptographic station being configured for:

applying a post-processing procedure to each received data string for generating a cryptographic key or an error symbol for each received data string, where the post-processing procedure includes at least one information reconciliation operation between the post-processing units of both cryptographic stations via an authenticated communication channel and a first privacy amplification procedure;

dividing the generated cryptographic keys into two or more shares and distributing them among the rest of post-processing units of the first and second cryptographic stations respectively;

generating a share of a secure cryptographic key by applying an error verification procedure and an additional privacy amplification procedure operation to the received cryptographic keys shares to extract keys that are shorter in length than a concatenation of the received cryptographic keys shares, wherein the extracted keys are securely generated in the presence of at least one untrusted post-processing units $CLPU^A_i$, $CLPU^B_{i'}$, wherein the extracted keys are not accessible to the untrusted post-processing units $CLPU^A_i$, $CLPU^B_{i'}$.

10. A system for secure cryptographic keys generation in a presence of untrusted units, the system comprising:

a first cryptographic station A and a second cryptographic station B, wherein each cryptographic station comprises at least one raw data generation unit, $KGU^A$, $KGU^B$ and more than one post-processing units $CLPU^A_i$, $CLPU^B_{i'}$, i=1, 2, s, i'=1, 2 ...,s', respectively, wherein $KGU^A$, $KGU^B$, $CLPU^A_i$, and $CLPU^B_{i'}$ are physical units or program units executed on physical processors in their respective cryptographic station, where:

the at least one raw data generation units in the first and second cryptographic stations generating a data string, $R^A$, $R^B$ respectively which are correlated to each other, comprising means for dividing the generated data strings into two or more shares and distributing them among the post-processing units of the first and second cryptographic stations respectively where $K'A_{ij}$ is the j-th share of $R^A$ received by $CLPU^A_j$ and $K'B_{ij'}$ is the j'-th share of $R^B$ received by $CLPU^B_{i'}$;

each post-processing unit of the first and second cryptographic station being configured for:

obtaining from each received share of the data strings a key generation sub-string share $K'A_{ij,key}$, $K'B_{ij',key}$, which is a subset of its respective share;

applying a post-processing procedure to the key generation sub-strings shares for generating secure cryptographic key shares, where said post-processing procedure comprises an information reconciliation operation between the processing units of both cryptographic stations via an authenticated communication channel and a privacy amplification procedure to extract keys shorter in length than $K'A_{ij}$ and $K'B_{ij'}$, wherein the keys are securely generated in the presence of at least one untrusted post-processing units $CLPU^A_I$, $CLPU^B_{I'}$, wherein the extracted keys are not accessible to the untrusted post-processing units $CLPU^A_i$, $CLPU^B_{i'}$.

* * * * *